United States Patent
Takahashi et al.

[11] Patent Number: 6,164,756
[45] Date of Patent: *Dec. 26, 2000

[54] RECORDING APPARATUS AND METHOD FOR DETECTING THE PRESENCE OF A BOUNDARY BETWEEN IMAGES AND RECORDING AN IMAGE IN ACCORDANCE THEREWITH

[75] Inventors: Kiichiro Takahashi, Kawasaki; Naoji Otsuka, Yokohama; Jiro Moriyama, Kawasaki; Kentaro Yano, Yokohama; Osamu Iwasaki, Kawasaki; Daigoro Kanematsu, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/790,589

[22] Filed: Jan. 29, 1997

Related U.S. Application Data

[63] Continuation of application No. 08/376,918, Jan. 23, 1995, abandoned.

[30] Foreign Application Priority Data

Jan. 25, 1994 [JP] Japan .................................. 6-006451

[51] Int. Cl.[7] .............................. B41J 2/21; B41J 2/145; B41J 2/15; B41J 29/38
[52] U.S. Cl. ................................ 347/43; 347/40; 347/14
[58] Field of Search ................................ 347/43, 40, 14, 347/19

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,168,552 | 12/1992 | Vaughn et al. .......................... 315/109 |
| 5,220,342 | 6/1993 | Moriyama ................................. 347/43 |
| 5,428,377 | 6/1995 | Stoffel et al. ............................ 347/15 |
| 5,455,610 | 10/1995 | Harrington ............................... 347/43 |
| 5,477,246 | 12/1995 | Hirabayashi et al. ................... 347/12 |
| 5,708,463 | 1/1998 | Hirabayashi et al. ................... 347/43 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 3146355 | 6/1991 | Japan . |
| 4158049 | 6/1992 | Japan . |
| 6047927 | 2/1994 | Japan . |
| 6087222 | 3/1994 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

When recording a color image on a recording medium according to record data using black ink and color ink of a plurality of colors having a different characteristic of permeation into the recording medium from the black ink, detecting the boundary between a black image and a color image is executed. For an area where the boundary has not been detected, normal printing which can record the image at a relatively high speed is set. For an area where the boundary has been detected, multi-pass printing which can record the image at a relatively low speed is set. Thus, a drop of recording speed and bleeding at the boundary are prevented.

56 Claims, 19 Drawing Sheets

FIG. 13

| Dk \ Dc | 0% | 0 TO 25% | 25 TO 50% | 50 TO 75% | 75 TO 100% |
|---|---|---|---|---|---|
| 0% | MODE 1 | MODE 1 | MODE 1 | MODE 1 | MODE 1 |
| 0 TO 25% | MODE 1 | MODE 2 | MODE 2 | MODE 3 | MODE 3 |
| 25 TO 50% | MODE 1 | MODE 2 | MODE 2 | MODE 3 | MODE 3 |
| 50 TO 75% | MODE 1 | MODE 2 | MODE 2 | MODE 4 | MODE 4 |
| 75 TO 100% | MODE 1 | MODE 2 | MODE 2 | MODE 4 | MODE 4 |

FIG. 15

| NUMBER OF COLORS | PRINTING METHOD |
|---|---|
| 0 | MODE 1 |
| 1 | MODE 1 |
| 2 | MODE 2 |
| 3 | MODE 3 |

FIG. 20

| MODE<br>RECORDING MEDIUM | MODE 1 | MODE 2 | MODE 3 | MODE 4 |
|---|---|---|---|---|
| PLAIN PAPER | 1-PASS | 2-PASS | 3-PASS | 4-PASS |
| COATED PAPER | 1-PASS | 1-PASS | 2-PASS | 2-PASS |
| OHP PAPER | 4-PASS | 4-PASS | 4-PASS | 4-PASS |
| OTHERS | 2-PASS | 2-PASS | 3-PASS | 3-PASS |

RECORDING APPARATUS AND METHOD FOR DETECTING THE PRESENCE OF A BOUNDARY BETWEEN IMAGES AND RECORDING AN IMAGE IN ACCORDANCE THEREWITH

This application is a continuation of application Ser. No. 08/376,918, filed Jan. 23, 1995, now abandoned.

BACKGROUND OF THE INVENTION

1. Field of the Invention

The present invention relates to a color ink jet recording method capable of recording a color image clearly and at high density, and particularly to a color ink jet recording method using color ink materials in yellow (Y), magenta (M) and cyan (C), or green (G), red (R) and blue (B) or the like, and black ink (Bk).

2. Related Background Art

An ink jet recording method is used in printers, copying machines, facsimile equipment and the like for the reasons such as low voice, low running cost, easy down-sizing, and easy color recording.

Normally, a color ink jet recording method uses three color ink materials, cyan, magenta and yellow, and in addition to them, black ink for color recording.

Conventional ink jet recording methods required using dedicated paper having an ink absorbing layer in order to obtain a color image in high color development without feathering or bleeding. In recent years, due to an improvement of ink, ink jet recording methods having a good aptitude for printing on "plain paper", which is used in large volume with printers, copying machines and the like, have been put to a practical use. However, under the present situation, the quality of printing on "plain paper" still remains at an unsatisfactory level. A primary factor for this is said to be difficulty in attaining both less ink bleeding between colors and good recording quality in black (particularly recording quality of black characters).

Usually, for recording a color image on plain paper by an ink jet recording method, quick drying ink featuring a high speed of penetration into plain paper is used. As a result, a high quality image without ink bleeding between colors is obtained. However, density is lower as a whole, and the ink tends to finely feather along fibers of paper around the recorded image area of each color, i.e. so-called feathering tends to take place.

Feathering is relatively less marked in a color image area, but is more likely to be marked in a black image area with a resultant deterioration in recording quality. In particular, when a black image is a character, a blurred character without sharpness will result, and hence the recording quality will be poor.

To obtain high quality black recording with less feathering and higher density, it is necessary to use black ink, which is relatively low in the speed of penetration into plain paper. In this case, however, each color ink bleeds at the boundary between recorded image areas in black and each color with a resultant marked damage to the recording quality.

Thus, contrary problems are involved in improving the color recording quality, i.e, prevention of the ink bleeding between black and colors and reduction of the feathering particularly of black ink in a compatible manner.

Accordingly, a recording method wherein recording is not made in an area along the boundary between black and color is proposed in Japanese Patent Application Laid-Open No. 3-146355. This method, however, has a drawback that data to be recorded changes.

Also, a recording method which uses a multi-color head for color recording and a character recording head and selects either one according to a record image is proposed in Japanese Patent Application Laid-Open No. 4-158049. This method, however, requires the character recording head in addition to the conventional color recording multi-color head with a resultant increase of cost and equipment size.

In the specification of Japanese Patent Application Nos. 4-205548 and 4-293022 filed by the applicant (now Japanese Laid-Open Patent Application Nos. 6-47927 and 6-87222, respectively), proposed is a method of preventing bleeding in the boundary between black and color by superimposing color ink materials to form a black area along the boundary between black and color. Thus produced black by using color ink materials is called PCBk (Process Color Bk). This method involves a problem of color tone in a black portion formed with color ink and a portion formed by mixing black and color at a certain rate.

On the other hand, also devised is a method wherein multi-pass printing is conducted in an area along the boundary between black and color to complete printing by a plurality of scans, thereby allowing previously applied ink to sufficiently fix and thus preventing bleeding in the boundary between black and color. Due to multi-pass printing, this method takes a longer printing time as compared with normal printing (1-pass printing) wherein printing is completed by one scan.

In multi-pass printing above, the more the scanning count increases, the longer the printing time becomes, and hence a longer time can be taken for fixing with a resultant good effect against bleeding. However, a printing speed drops. Thus, the ink configuration above brings a high quality image with good recording quality in black and no bleeding between colors, but sacrifices the printing speed. The printing speed is a very important parameter for recording apparatus, and hence it is a problem to solve for color ink jet recording apparatus to attain both high quality image and higher printing speed.

SUMMARY OF THE INVENTION

In view of the foregoing, it is an object of the present invention to provide a color ink jet recording method which attains both high quality image and higher printing speed.

In order to achieve the above object, according to the present invention, there is provided a color ink jet recording method which uses black ink and color ink of a plurality of colors having a different characteristic of permeation into a recording medium from the black ink and which records a color image on the recording medium according to record data, comprising the steps of determining whether the degree of closeness between a black image and a color image is high or not, and recording an image at a speed according to the degree determined.

According to the present invention, there is also provided a color ink jet recording method which uses black ink and color ink of a plurality of colors having a different characteristic of permeation into a recording medium from the black ink and which records a color image on the recording medium according to record data, comprising the steps of determining whether or not an area is high in the degree of bleeding between a black image and a color image, and recording an image at a speed according to the degree determined.

According to the present invention, there is also provided a color ink jet recording method which uses black ink and color ink of a plurality of colors having a different characteristic of permeation into a recording medium from the black ink and which records a color image on the recording medium according to record data, comprising the steps of detecting the boundary between a black image and a color image, and recording an image at a speed according to the detected presence/absence of the boundary.

According to the present invention, there is also provided a color ink jet recording method which uses black ink and color ink of a plurality of colors having a different characteristic of permeation into a recording medium from the black ink and which records a color image on the recording medium according to record data, comprising the steps of detecting a black character portion, and recording an image at a speed according to the detected presence/absence of the black character portion.

According to the present invention, there is also provided color ink jet recording method which uses black ink and color ink of a plurality of colors having a different characteristic of permeation into a recording medium from the black ink and which records a color image on the recording medium according to record data, comprising the steps of detecting the duty of record data, and recording an image at a speed according to a detected duty.

According to the present invention, there is also provided a color ink jet recording method which uses black ink and color ink of a plurality of colors having a different characteristic of permeation into a recording medium from the black ink and which records a color image on the recording medium according to record data, comprising the steps of detecting the number of colors coexisting with a black image, and recording an image at a speed according to the detected number of colors.

According to the present invention, there is also provided color ink jet recording method which uses black ink and color ink of a plurality of colors having a different characteristic of permeation into a recording medium from the black ink and which records a color image on the recording medium according to record data, comprising the steps of detecting whether a black image and a secondary color image coexist, and recording an image at a speed according to the detected presence/absence of the coexistence.

According to the present invention, there is also provided a color ink jet recording method which uses black ink and color ink of a plurality of colors having a different characteristic of permeation into a recording medium from the black ink and which records a color image on the recording medium according to record data, comprising the steps of detecting multivalued data of a record image, and recording an image at a speed according to the detected presence/absence of the multivalued data.

According to the present invention, there is also provided a color ink jet recording method which uses black ink and color ink of a plurality of colors having a different characteristic of permeation into a recording medium from the black ink and which records a color image on the recording medium according to record data, comprising the steps of detecting the transfer time of record data, and recording an image at a speed according to a detected transfer time.

According to the present invention, there is also provided a color ink jet recording apparatus which uses black ink and color ink of a plurality of colors having a different characteristic of permeation into a recording medium from the black ink and which records a color image on the recording medium according to record data, comprising determining means for determining whether the degree of closeness between a black image and a color image is high or not, and recording control means for recording an image at a speed according to the degree determined.

According to the present invention, there is also provided a color ink jet recording apparatus which uses black ink and color ink of a plurality of colors having a different characteristic of permeation into a recording medium from the black ink and which records a color image on the recording medium according to record data, comprising determining means for determining whether or not an area is high in the degree of bleeding between a black image and a color image, and recording control means for recording an image at a speed according to the degree determined.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting the boundary between a black image and a color image, and recording control means for recording an image at a speed according to the detected presence/absence of the boundary.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting a black character portion, and recording control means for recording an image at a speed according to the detected presence/absence of the black character portion.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting the duty of record data, and recording control means for recording an image at a speed according to a detected duty.

According to the present invention there is also provided a color ink jet recording apparatus which uses black ink and color ink of a plurality of colors having a different characteristic of permeation into a recording medium from the black ink and which records a color image on the recording medium according to record data, comprising detecting means for detecting the number of colors coexisting with a black image, and recording control means for recording an image at a speed according to the detected number of colors.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting whether a black image and a secondary color image coexist, and recording control means for recording an image at a speed according to the detected presence/absence of the coexistence.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting multivalued data of a record image, and recording control means for recording an image at a speed according to the detected presence/absence of the multivalued data.

According to the present invention, there is also provided a color ink jet recording apparatus which uses black ink and color ink of a plurality of colors having a different characteristic of permeation into a recording medium from the black ink and which records a color image on the recording medium according to record data, comprising detecting means for detecting the transfer time of record data, and recording control means for recording an image at a speed according to a detected transfer time.

The above construction allows an optimum printing method to be selected according to the state of black and color images. As a result, bleeding in the boundary between a black image area and a color image area can be prevented, and also the printing speed can be minimized.

BRIEF DESCRIPTION OF THE DRAWINGS

FIG. 1 is a perspective view showing an ink jet recording apparatus which the present invention is applicable to;

FIGS. 2A and 2B are views showing the head mechanism of the ink jet recording apparatus which the present invention is applicable to;

FIG. 3 is a block diagram showing the control circuit of the ink jet recording apparatus which the present invention is applicable to;

FIG. 13 is a printing method setting table according to the print duty used in the third embodiment;

FIG. 15 is a printing method setting table according to the number of colors used in the fourth embodiment;

FIG. 20 is an exemplified printing method setting table according to modes and recording media.

DETAILED DESCRIPTION OF THE PREFERRED EMBODIMENTS

Embodiments of the present invention will now be described with reference to the drawings.

In each embodiment, multi-pass printing is not executed over a whole image area, but high speed printing such as 1-pass printing or the like, not multi-pass printing, is set for a normal area. Low speed multi-pass printing is executed only for an area having a higher potential of bleeding of black and color images, for example, a case where a black image area and a color image area are close to each other. That is, multi-pass printing is executed only for a portion which needs to be multi-pass printed and is not executed for the rest. The printing speed drops only in a multi-pass printed portion, and the other area is printed normally, thereby minimizing a drop in speed.

First, preconditions of each embodiment will be described.

Figure 1:
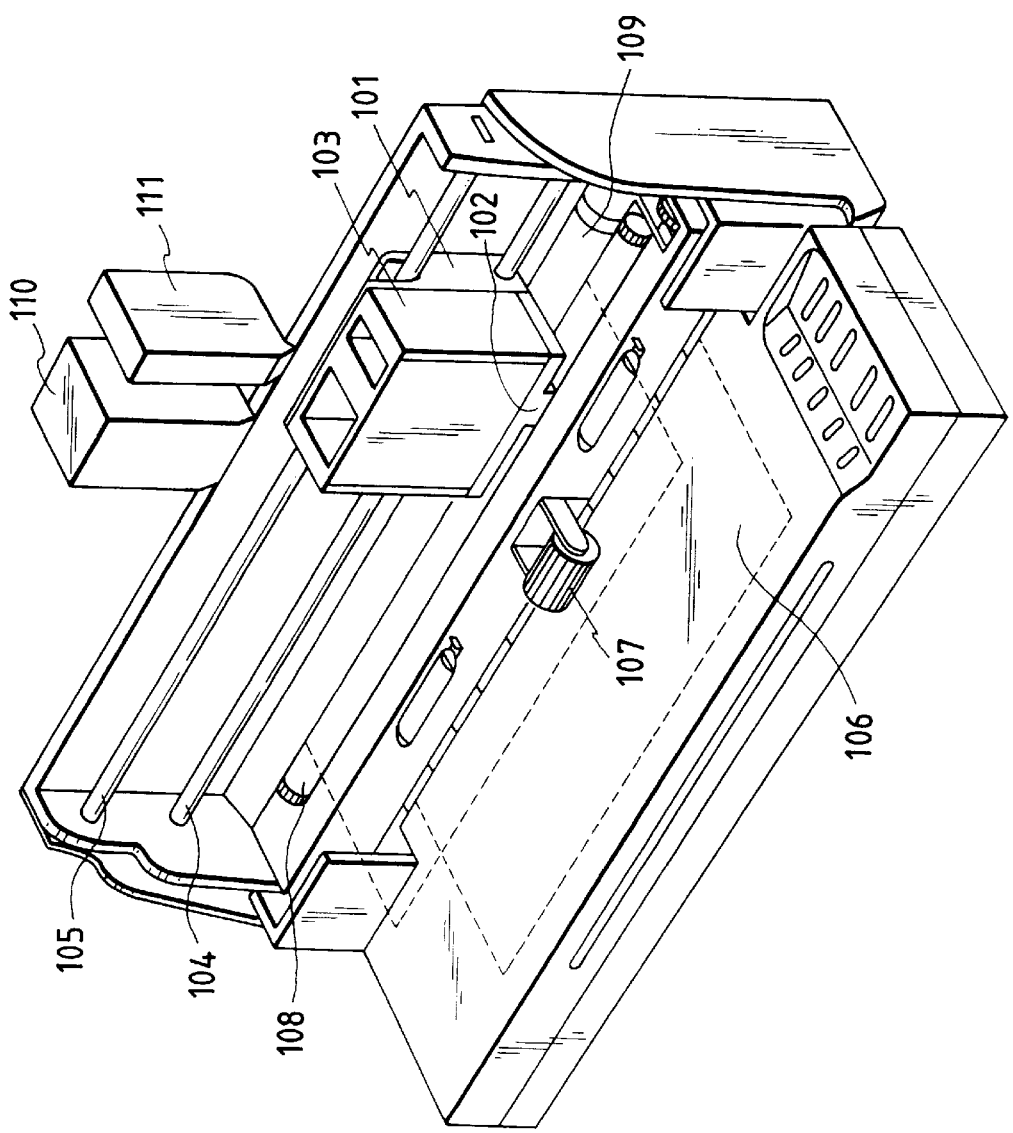

FIG. 1 is a perspective view showing a recording apparatus which an ink jet recording method according to an embodiment of the present invention is applied to.

A carriage 101 carries a recording head 102 and a cartridge guide 103 and can scan on guide shafts 104, 105.

Recording paper 106 is fed into the recording apparatus, held between a paper feed roller 108 and pinch rollers (not shown) and a paper presser plate 109, and then fed beyond the paper feed roller 108. A color ink cartridge 110 containing three color materials of yellow, magenta and cyan and a black ink cartridge 111 are inserted into a cartridge 103 to be in communication with a recording head 102.

The yellow, magenta and cyan ink materials contained in the color ink cartridge 110 have a high penetrating speed into the recording paper in order to prevent ink bleeding at the boundary between colors when recording a color image. On the other hand, black ink contained in the black ink cartridge 111 has a relatively slower penetrating speed into the recording paper as compared with the three color ink materials in order to attain high quality recording with a black image at high density and less feathering.

Figure 2A:
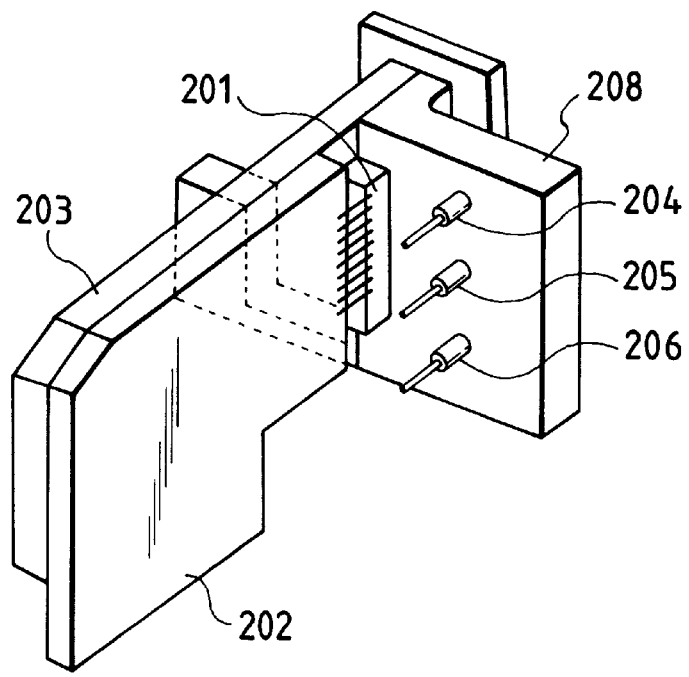
Figure 2B:
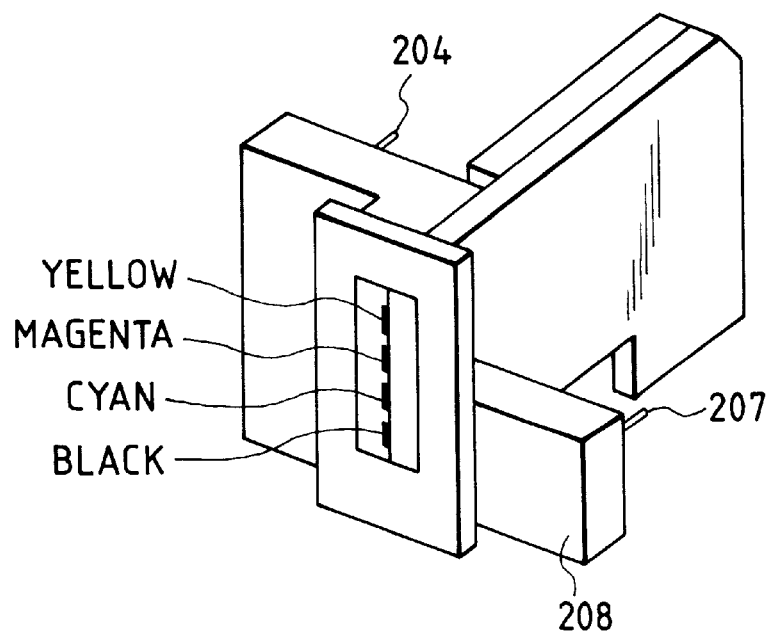

FIGS. 2A and 2B show the recording head 102. FIG. 2A is a view from a rear side and FIG. 2B is a view from a front side. Yellow, magenta, cyan and black ejection outlet groups are arranged in a straight line on the front face of the recording head 102. Each group of yellow, magenta and cyan has 24 ejection outlets, and the black group has 64 ejection outlets. Color groups are spaced by not less than a nozzle pitch.

Each ejection outlet is provided with an ink passage in communication therewith. A common ink chamber is disposed behind the ink passages to feed ink thereto. An ink passage corresponding to each ejection output is provided with an electrothermal transducer to generate thermal energy used for ejecting an ink droplet from an ejection outlet and with electrode wiring to supply electric power to the electrothermal transducer. The electrothermal transducers (ejection heaters) and electrode wiring are formed on a substrate 201 comprising silicon and others by a film forming technique. Partition walls, a top plate and the like comprising resin and glass material are layered on the substrate, thereby forming the ejection outlets, ink passages and common ink chambers. A driving circuit is provided behind them in the form of a printed circuit board to drive the electrothermal transducers based on a recording signal.

A grooved top plate (orifice plate) provided with partition walls for separating a plurality of ink passages, common ink chambers and the like without using the glass material may be stuck on the substrate. The grooved top plate is integrally molded, and material therefor is preferably polysulfone or may be some other molding resin.

Pipes 204 to 207 project from a plastic member 208 called a distributor extending perpendicularly to the silicon substrate in parallel with an aluminum plate 203, which is in parallel with the silicon substrate and a printed circuit board 202. Moreover, the pipes 204 to 207 are in communication with passages in the distributor, and the passages are in communication with the common ink chambers.

There exist four passages in the distributor for yellow, magenta, cyan and black. The passages connect respective common ink chambers and pipes.

According to the embodiments, a color ink tank and a Bk ink tank can be replaced independently. However, a disposable type recording head wherein an ink tank and a printing head are integrally formed may be used.

About 40 ng of ink is ejected from an ejection outlet for yellow, magenta or cyan provided in the recording head 102, and about 80 ng of ink is ejected from an ejection outlet for black.

The composition of ink used in the embodiments is listed below.

1. Y (yellow)

| | |
|---|---|
| C.I. Direct Yellow 86 | 3 parts |
| Diethylene glycol | 10 parts |
| Isopropyl alcohol | 2 parts |
| Urea | 5 parts |
| Acetylenol EH (Kawaken Chemical) | 1 part |
| Water | the balance |

2. M (magenta)

| | |
|---|---|
| C.I. Acid Red 289 | 3 parts |
| Diethylene glycol | 10 parts |
| Isopropyl alcohol | 2 parts |
| Urea | 5 parts |
| Acetylenol EH (Kawaken Chemical) | 1 part |
| Water | the balance |

3. C (cyan)

| | |
|---|---|
| C.I. Direct Blue 199 | 3 parts |
| Diethylene glycol | 10 parts |
| Isopropyl alcohol | 2 parts |
| Urea | 5 parts |
| Acetylenol EH (Kawaken Chemical) | 1 part |
| Water | the balance |

4. Bk (black)

| | |
|---|---|
| C.I. Direct Black 154 | 3 parts |
| Diethylene glycol | 10 parts |
| Isopropyl alcohol | 2 parts |
| Urea | 5 parts |
| Water | the balance |

As shown above, in contrast with black ink, cyan, magenta and yellow ink materials contain additional Acetylenol EH by 1% for improving permeability. In addition to Acetylenol EH, other surfactants, alcohol and the like are also available.

Figure 3:
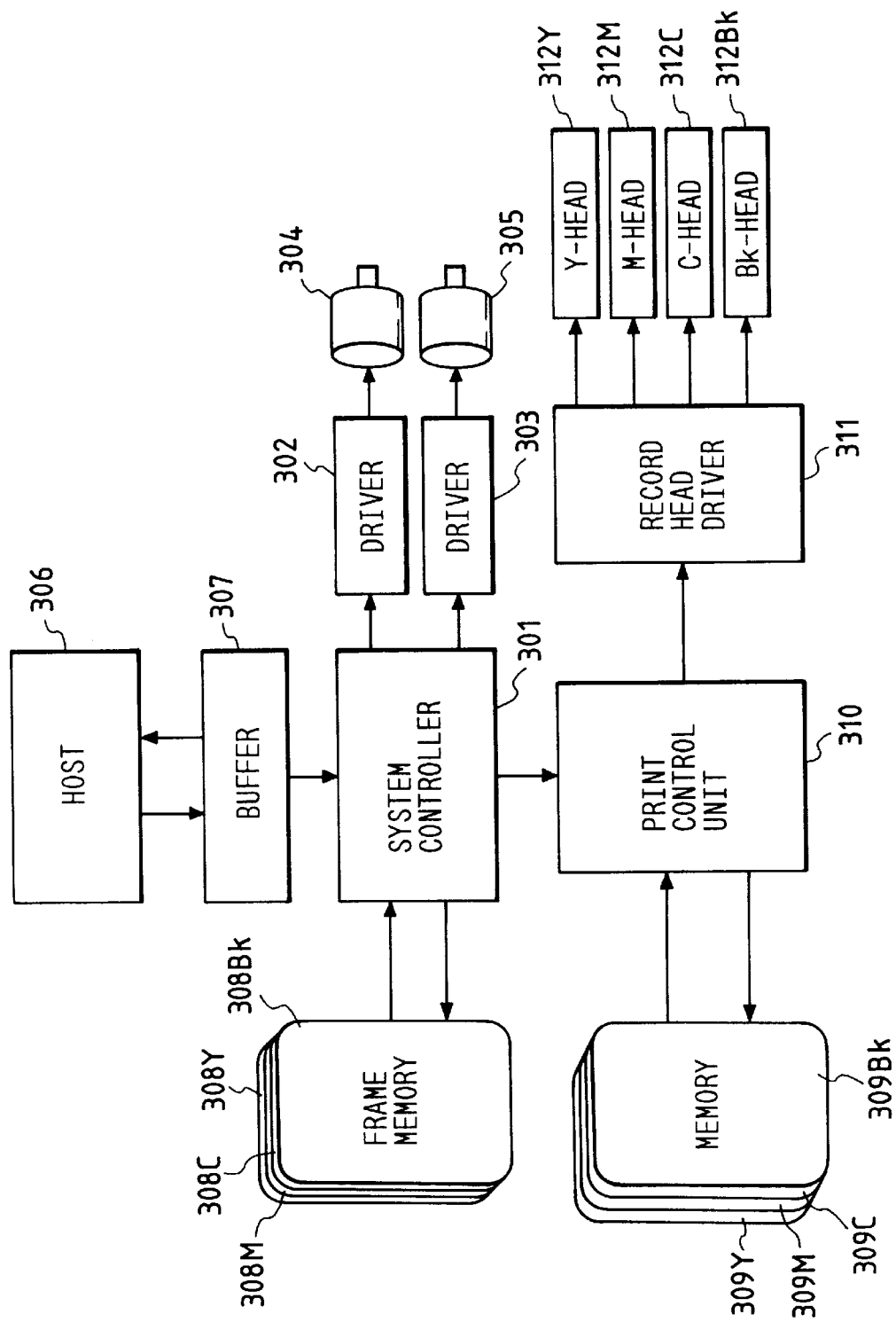

FIG. 3 is a block diagram of the electric control system of the color ink jet printer described above.

Reference numeral 301 denotes a system controller to control the whole apparatus. The system controller 301 contains a microprocessor, a storage device (ROM) storing control programs, a storage device (RAM) used by the microprocessor for processing and other devices. 302 denotes a driver to drive the printing head in a main scanning direction. Likewise, 303 denotes a driver to effect movement in a sub-scanning direction. 304 and 305 denote motors corresponding to the drivers. The motors 304, 305 operate in response to information such as speed and distance of movement received from the drivers.

306 denotes a host computer to transfer information to be printed to a printing apparatus according to the present invention. 307 denotes a receive buffer to temporarily store data from the host computer 306. The receive buffer 307 retains the data until the system controller 301 reads it therefrom. 308 denotes a frame memory to develop the data to be printed into image data. The frame memory 308 has a required size for printing. The description of the embodiments covers the frame memory having a capacity capable of storing data corresponding to one sheet of printing paper. The present invention, however, is not to limit the frame memory size.

309 denotes a storage device to temporarily store data to be printed, and the storage capacity thereof depends on the number of nozzles of the recording head. 310 denotes a print controller to appropriately control the printing head under directions from the system controller, i.e. to control an ejecting speed, the number of data and others. 311 denotes a driver to drive a nozzle (head) 312Y for ejecting yellow ink, a nozzle (head) 312M for ejecting magenta ink, a nozzle (head) 312C for ejecting cyan ink, and a nozzle (head) 312Bk for ejecting black ink. The driver 311 is controlled by a signal from the print controller 310.

(First embodiment)

A first embodiment described below is to detect the boundary between a black image area and a color image area for record data and to determine a printing method according to whether the boundary is present.

Figure 4:
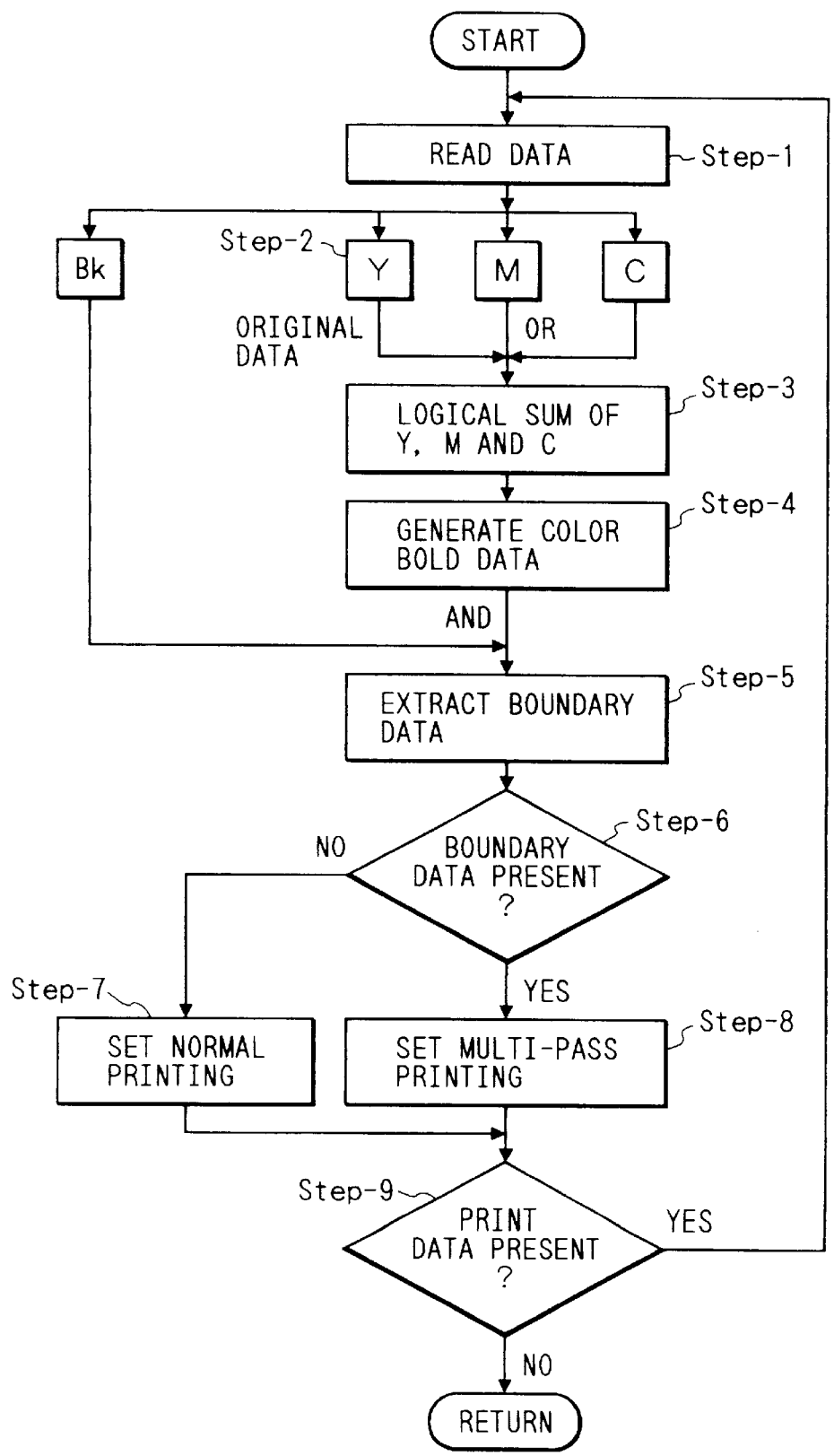
FIG. 4 is a sequence chart executed in a first embodiment for detecting the boundary between a black image and a color image and for setting a printing method.

FIG. 4 shows a sequence of detecting a boundary for detecting a black image area in contact with a color image area and of setting a printing method.

At Step-1, print data is read for boundary detection and stored temporarily in a storage medium like RAM or the like. The amount of data to be read depends on the capacity of the storage medium possessed by a printer body. Taking a recordable width by one scan of the recording head as one line, the amount of data to be read is set to several lines of data.

At Step-2, a logical sum (OR) of the Y, M and C data out of original image data of individual colors (Bk, Y, M, and C) to be recorded is obtained. At Step-3, the ORed data of Y, M and C is temporarily stored in a buffer as color data.

At Step-4, bold data is generated by expanding the color data upward and downward and rightward and leftward n bits each and then is temporarily stored in the buffer. This operation is performed using a drag shift, a function of a gate array. While shifting addresses, a logical sum with base data is obtained, thereby boldfacing the base data in the shifted direction. This is performed in four directions, upward, downward, leftward and rightward, n bits each to generate color data which is boldfaced upward, downward, leftward and rightward n bits each. n is a natural number and can be set according to characteristics of black ink and color ink.

Specifically, the present embodiment uses an optimum 4-bit shift in consideration of the composition of ink described above and the landing accuracy of the recording head.

At Step-5, the logical product of the color bold data and the Bk original data is obtained, and the ANDed data is extracted as boundary data. Thus the boundary (black data side) between the black image area and the color image area can be extracted. By changing the boldfacing amount of the color data, this sequence can control the spacing between the black data and the color data to be detected. Since this sequence can be executed at multistages, it is also possible to detect directivity at the boundary between the black image area and the color image area.

At Step-6, whether the boundary exists is determined from the result of the boundary detection.

This determination is made from whether the boundary data is present in a raster. If the boundary data is absent, normal printing is set at Step-7. If the boundary data is present, multi-pass printing is set at Step-8.

A specific example according to the present embodiment will now be described. The recording head has separate ink chambers for four colors described above. 1-pass printing is employed as normal printing for improving throughput. Hence, data on black characters only can be printed at the highest speed of the printer body. 3-pass printing is employed as multi-pass printing. Since the recording head is in the form shown in FIGS. 2A and 2B, when black and color data are printed on one print area, a time lag derived from construction occurs. 3-pass printing is larger in time lag for improving a fixing performance and for less bleeding, thereby improving print quality.

3-pass printing used in the present embodiment employs one-third of the paper feed (quantity of sub-scan) of normal printing and completes an image recorded on the record medium in the same area by three times of printing using different areas of the recording head. Thus, the fixing performance improves, and dispersion in ink discharge from a nozzle (ejection outlet) of the recording head can be reduced.

One time of printing is performed in a complementarily thinning manner to complete an image by three times of printing. Complementary thinning may use a fixed pattern or may use a random pattern to prevent synchronism with an image. Also, the fixing performance improves by recording using the same area of the recording head without effecting paper feed.

At Step-9, whether print data is present is determined. If the print data is present, processing returns to Step-1 to repeat again the sequence of detecting the boundary and setting a printing method. If the print data is absent, this sequence terminates.

Figure 5:
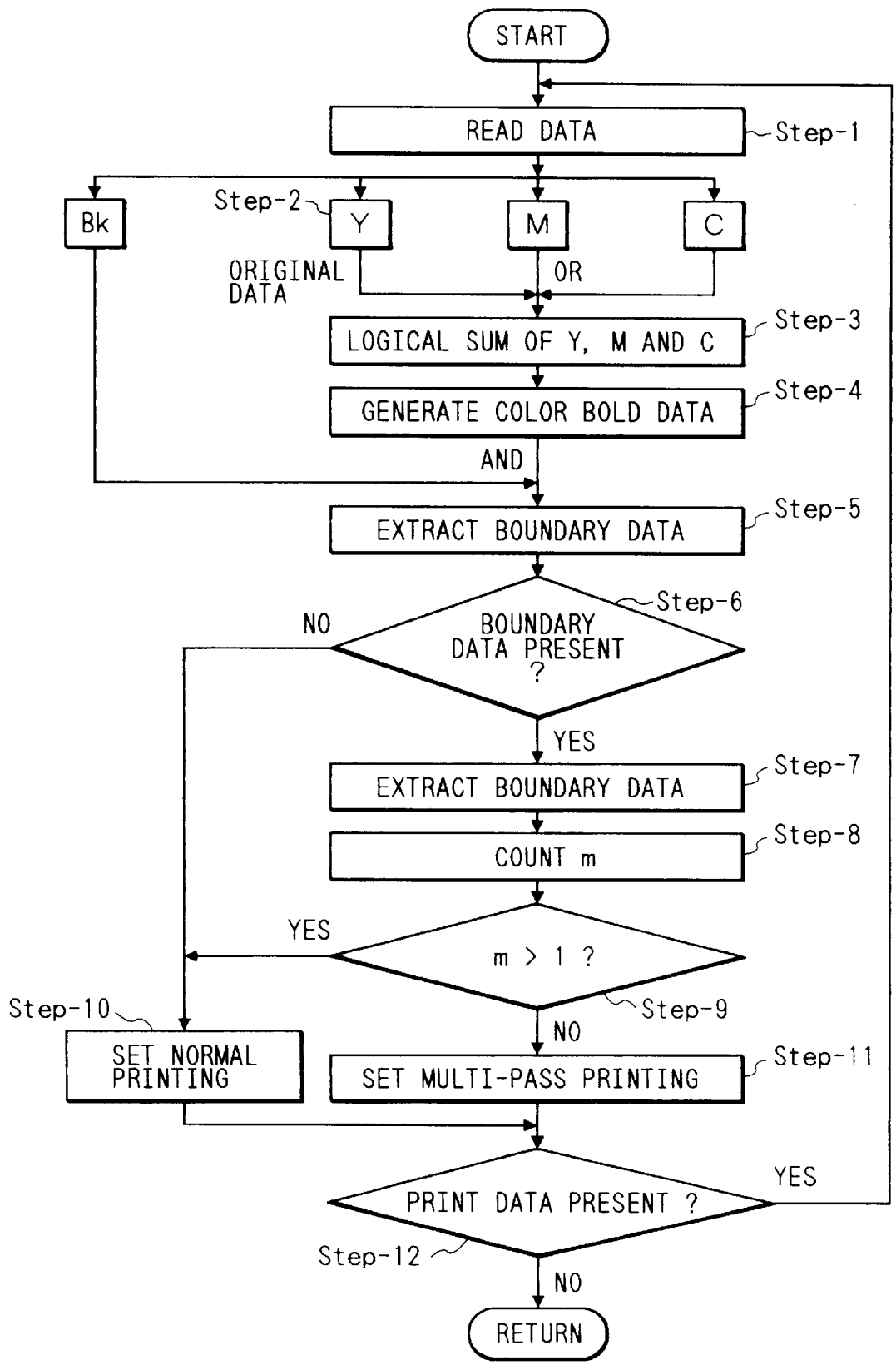
FIG. 5 is a sequence chart executed in the first embodiment for detecting the boundary between a black image and a color image and for setting a printing method.

FIG. 5 shows a sequence for switching printing methods more efficiently. Step-1 through Step-6 are identical to those of the sequence of FIG. 4, and hence the description thereof is omitted.

When it is determined at Step-6 that no boundary data is present, normal printing is set at Step-10. If the boundary data is present, it is extracted at Step-7, and the number of rasters up to the boundary, m, is counted at Step-8. That is, the position of the boundary in the print data subject to the determination is extracted. In the present embodiment, data undergoes the determination in rasters.

At Step-9, it is determined whether the number of rasters up to the boundary is longer than a head length. The head length, l, is stored in the printer body in advance. Since the present embodiment uses the recording head of FIGS. 2A and 2B, a length corresponding to Bk nozzles is taken as l. More specifically, since there are 64 Bk nozzles, l=64 rasters. This value depends on the form of the recording head. If the number of rasters up to the boundary, m, is larger than l, i.e. if a maximal use of Bk nozzles is possible, normal printing is set at Step-10. If the number of rasters up to the boundary, m, is less than l, multi-pass printing is set at Step-11.

At Step-12, it is determined whether the print data is present. If the print data is present, processing returns to Step-1 to repeat again the sequence of detecting the boundary and setting a printing method. If the print data is absent, this sequence terminates.

An exemplified process of recording with the recording head shown in FIGS. 2A and 2B using the sequence of FIG. 5 will now be described with reference to FIG. 6.

In the present embodiment, 64 nozzles for Bk and 24 nozzles each for Y, M and C are used, and the spacing between the nozzle groups is equivalent to 8 nozzles. At 1st and 2nd scans, recording is done by 1-pass printing. Rasters at up to the 2nd scan have only a black image and hence are printed using all 64 Bk nozzles. At 3rd scan where the recording head enters a raster having the boundary between a color image and a black image, the printing method changes to multi-pass printing according to the sequence described above. In the present embodiment, 3-pass printing is effected.

In recording by 3-pass printing at and after the 3rd scan, 24 Bk nozzles most apart from a color nozzle are used to take a sufficient lag time between the formation of a black image and the formation of a color image. Taking a sufficient lag time allows the previously recorded Bk image to considerably fix before the color image is formed. When the recording head moves from a raster having the boundary to a raster having only a black image, not shown, the printing method switches from 3-pass printing to 1-pass printing in the present embodiment. In this case, the printing method does not switch immediately when the recording head enters the raster having only a black image, but it switches when the color data to be 3-pass printed has run out. That is, the printing method switches on completion of printing a raster which is to be multi-pass printed. Bleeding at the boundary is securely prevented to realize a high quality image.

Figure 7:
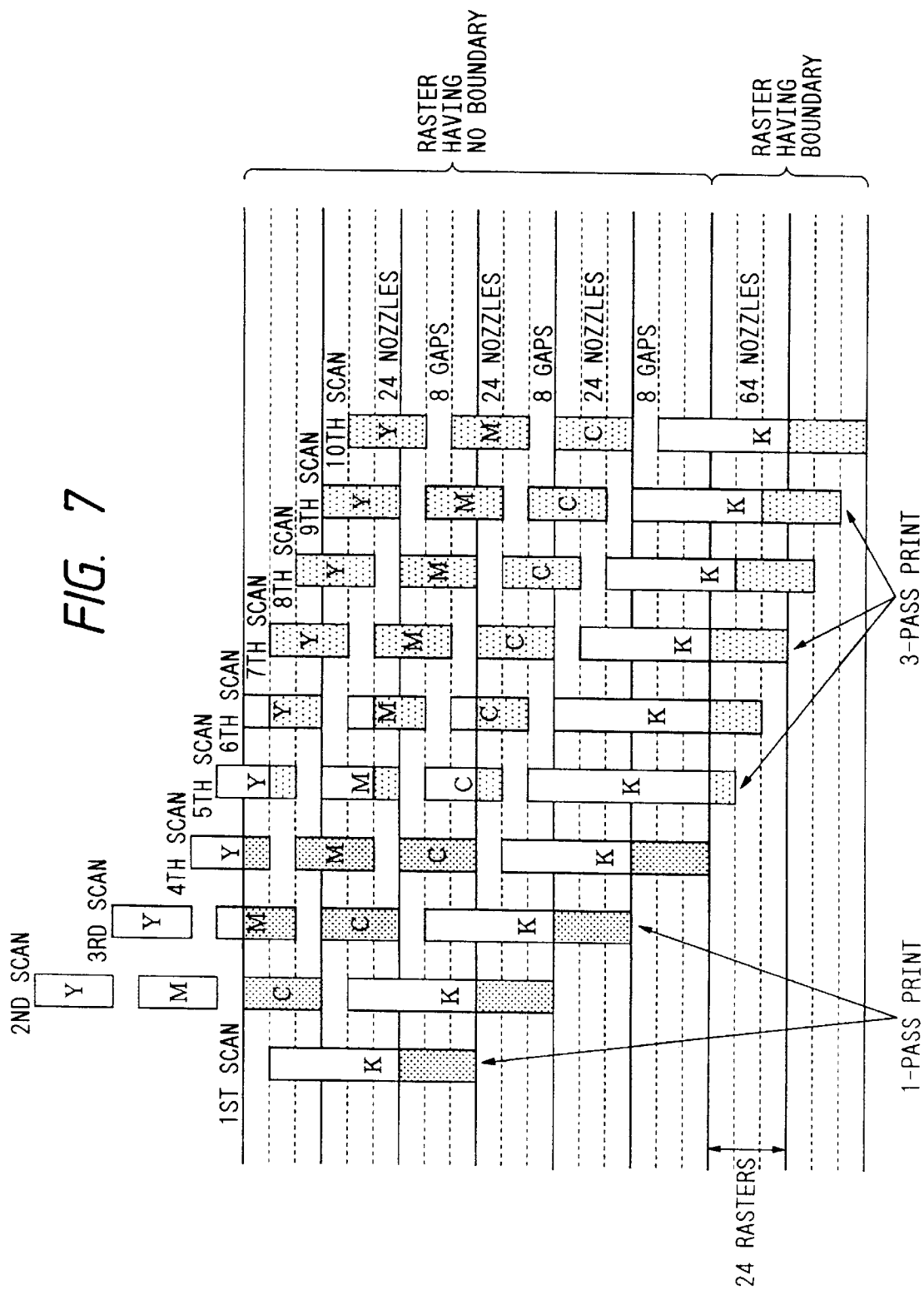
FIG. 7 is a diagram showing operations of the recording head when it has shifted from a color image to an image having a boundary in the first embodiment.

Next, FIG. 7 shows an example of forming a color image when the recording head moves from a raster having no boundary to a raster having a boundary.

At up to the 4th scan, both Bk and color data are 1-pass printed. At the 5th scan, 1-pass printing switches to 3-pass printing. When a Bk nozzles enters the boundary, i.e. at the 5th scan, the printing method switches, and the data is recorded by 3-pass printing at and after the 5th scan. There exist both black and color images in a raster having no boundary, but 1-pass printing making the maximal use of 24 color nozzles is executed because the boundary with potential bleeding is not involved. 24 Bk nozzles most apart from a color nozzle are used regardless of the printing method. When the recording head moves from a raster having the boundary to a raster having no boundary, not shown, 3-pass printing continues as far as color data to be 3-pass printed is present, and 3-pass printing does not switch to 1-pass printing until 3-pass printing becomes unnecessary, as in the case of FIG. 6

At and after the 5th scan, both Bk and color data are 3-pass printed. Hence, for example, when a secondary color G (green) is formed from Y and C, printing one image involves 1-pass print for Y and C and 1-pass print for C and 3-pass print for Y. In such a case, a delicate aberration of color tone may arise. This depends greatly on ink characteristics. For the highly permeable color ink used in the present embodiment, a difference in density between 1-pass print and 3-pass print is hard to arise, and hence such aberration of color tone hardly arises. By combining processes of FIGS. 6 and 7 for switching printing methods in a multistage manner, an optimum printing method can be set according to record images.

Figure 8:
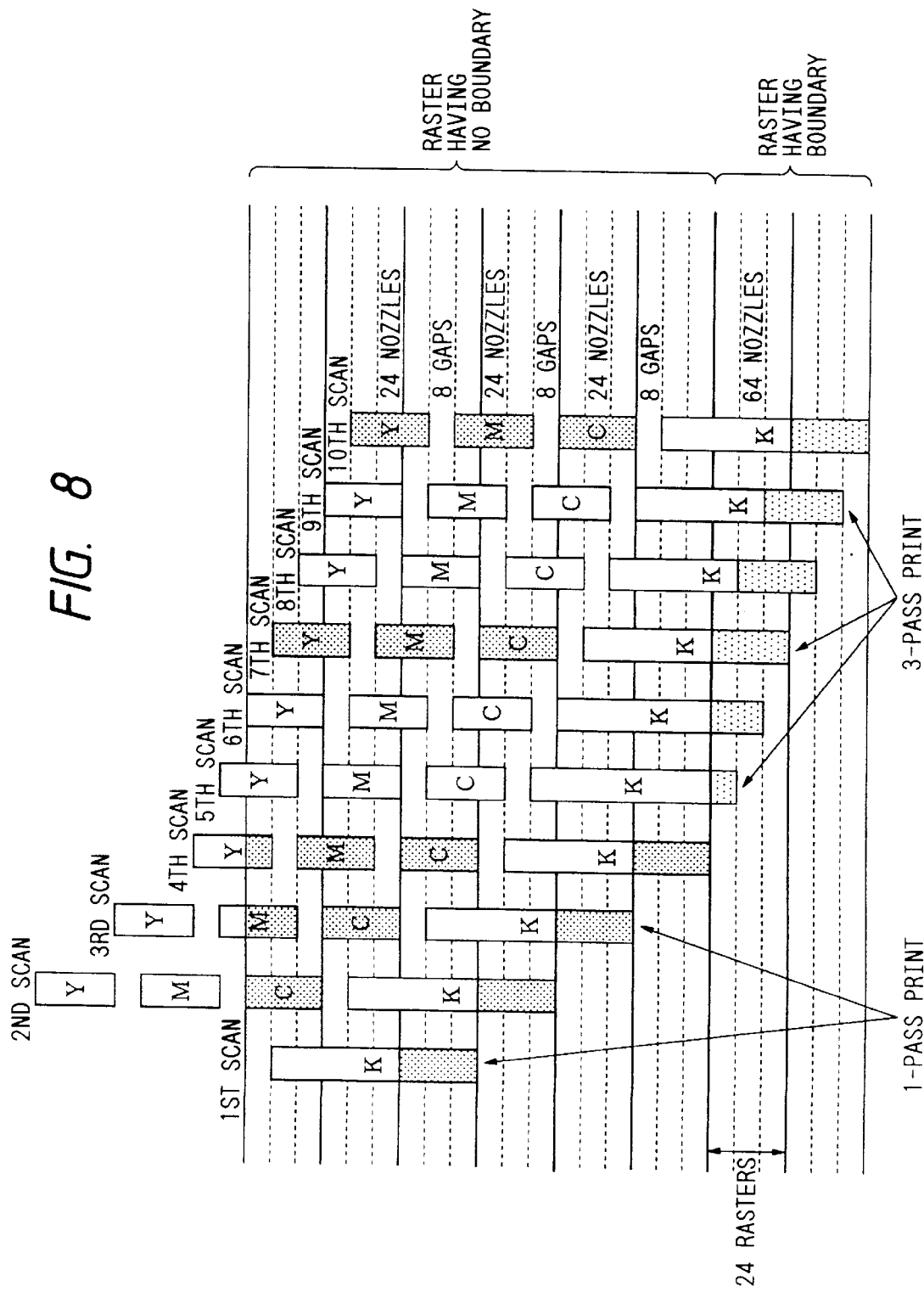
FIG. 8 is a diagram showing operations of the recording head when it has shifted from a color image to an image having a boundary in the first embodiment.
Figure 9:
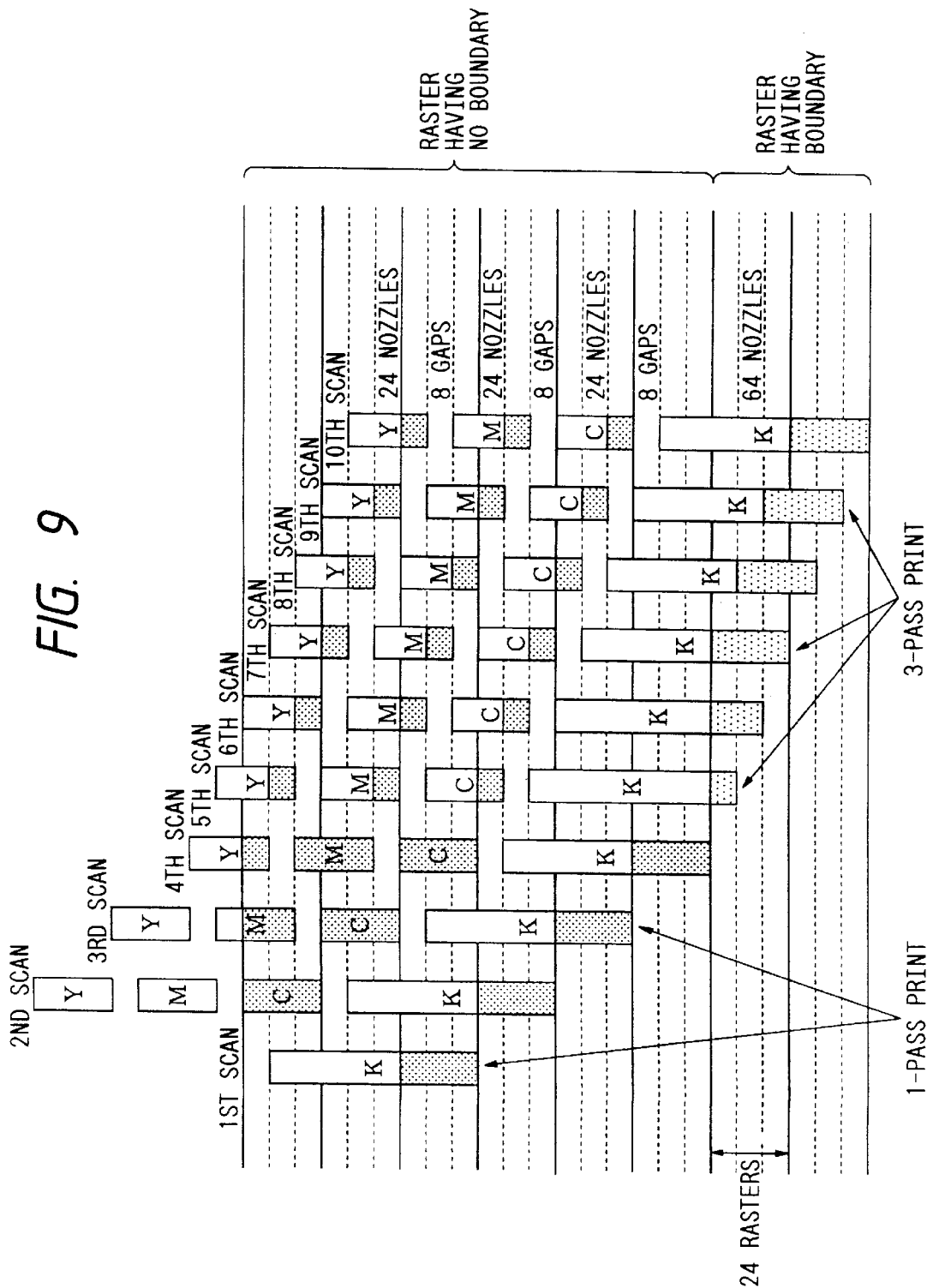
FIG. 9 is a diagram showing operations of the recording head when it has shifted from a color image to an image having a boundary in the first embodiment.

However, when ink materials having different characteristics and a relatively lower permeability are used, a problem may arise. In such a case, a similar sequence of setting a printing method is used, but printing methods are not switched for each scan, but for each raster. That is, one recording head involves different printing methods. FIGS. 8 and 9 show an example of forming an image in such a case.

In FIG. 8, 1-pass printing is performed at up to the 4th scan, and at and after 5th scan, 3-pass printing is performed for Bk, but 1-pass printing remains unchanged for colors. However, since a paper feed is for 3-pass printing, printing is effected once per three scans for each color. This is intended to switch the printing method to 3-pass printing only for those nozzles which print a raster having a boundary. This switching method is free from the occurrence of an aberration of color tone within one image for a secondary color. Since color nozzles are used evenly, this switching method has an advantage that a temperature distribution is hard to arise and that an uneven image density is hard to arise.

Likewise, in FIG. 9, printing methods are switched for each raster. At and after 5th scan, only 8 color nozzles are used for printing at each scan. As a result, an aberration of color tone does not arise for a secondary color as in the case of FIG. 8. Also, since color nozzles are always used, power load fluctuations are less likely to occur.

Figure 6:
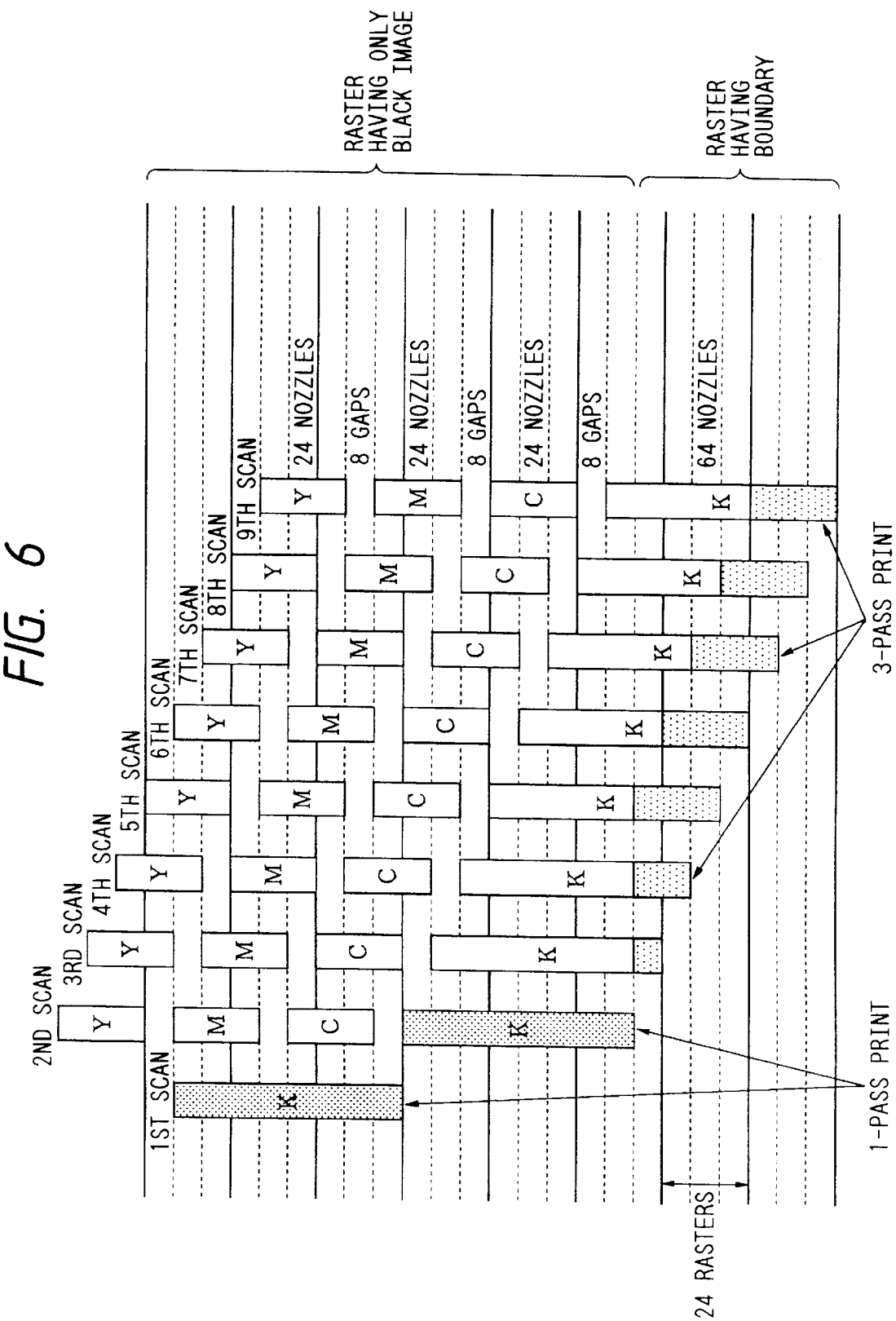
FIG. 6 is a diagram showing operations of a recording head when it has shifted from a black image to an image having a boundary in the first embodiment.

By combining processes of FIGS. 6 and 7 or of FIGS. 8 and 9 for switching printing methods in a multistage manner, an optimum printing method can be set according to record images.

As described above, when a boundary is found to be present as a result of boundary detection, multi-pass printing is performed in order to suppress bleeding and hereby to record a high quality image; when a boundary is found to be absent, normal printing is performed for high speed printing. As a result, an optimum printing method can be selected according to print data. By setting an optimum printing method according to record images, a high quality black record having less feathering and a high quality color record can be realized in a compatible manner, and also a drop of printing speed can be minimized. Thus, it is possible to make a maximal use of the performance of the recording head and to effect high quality, high-speed recording best suited for a record image.

The above description of the present embodiment covers the recording head wherein Bk, C, M and Y nozzles shown in FIG. 2B are arranged in a row.

However, it is apparent that the present invention is also applicable to such a construction that recording heads of four colors are arranged in the scanning direction of a carriage.

(Second embodiment)

A second embodiment described below is to extract black characters and to perform text printing only for the black character portion.

At present, one point color (some color graphics exist in a black text) is a dominant form of color images, and pictorial images like paintings are less likely to be the case. Hence, by printing the black text at a high speed and by multi-pass printing a smaller portion of a color image in spite of a longer printing time, optimum printing, i.e. high quality and high-speed printing can be performed for a one point color image.

The commonly used size of black characters ranges from 6-point (2 mm) to 24-point (8 mm). Even large characters are of a size of up to 72-point (24 mm). In the present embodiment, a black character is extracted by detecting a null raster having no data.

Figure 10:
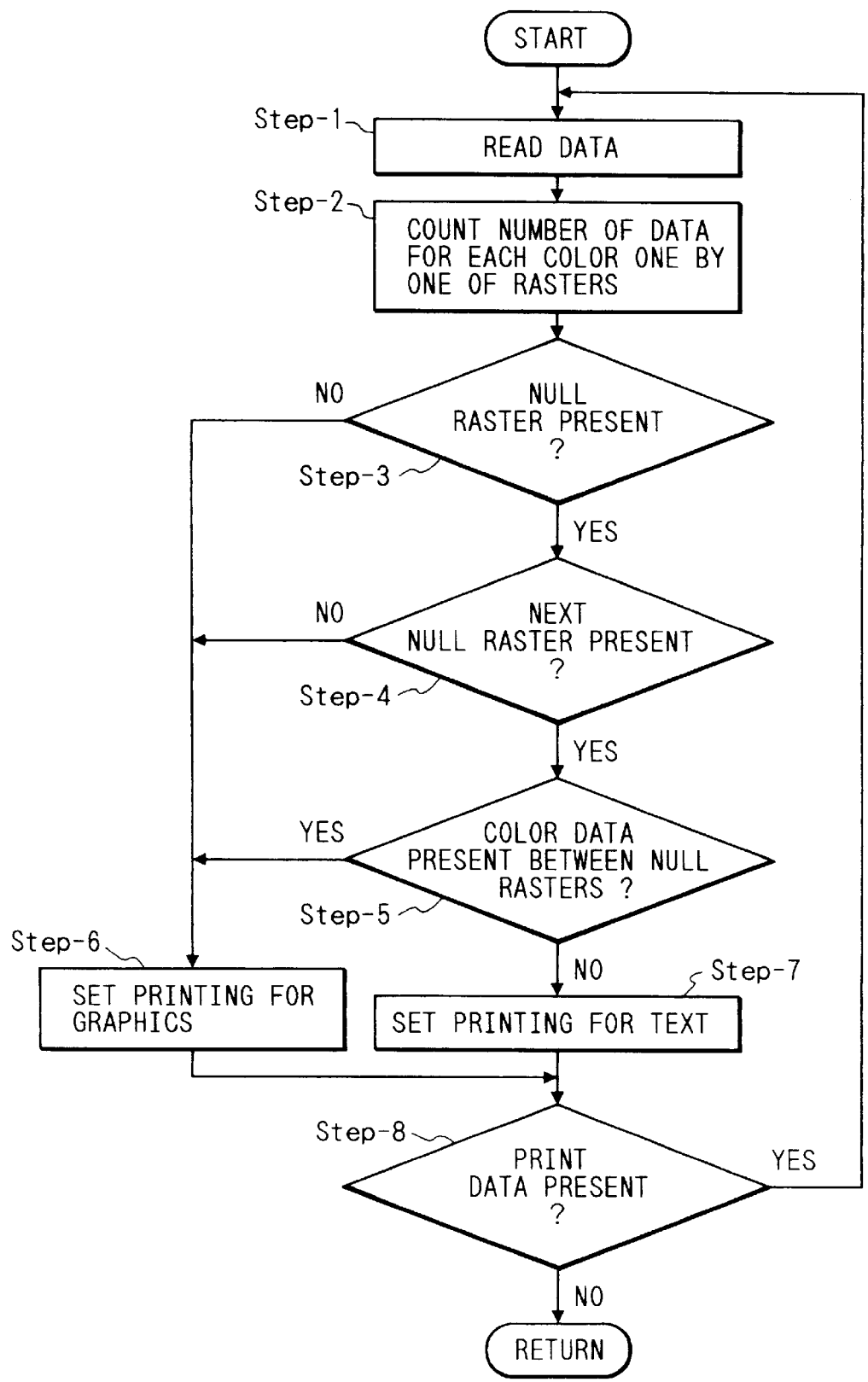
FIG. 10 is a sequence chart executed in a second embodiment for detecting a black character and for setting a printing method.

FIG. 10 shows a sequence of detecting a black character and of setting a printing method. At Step-1, print data is read, and the read data is temporarily stored in a storage medium such as RAM or the like. The storage medium can store data independently for each of Bk, Y, M and C, but the capacity of the storing medium depends on the size of a character to be extracted. For example, when characters of up to 72-point are to be extracted, it is necessary to store 340 rasters or more at 360 dpi. For the lengthwise (or vertical), oriented A4 size, the required capacity is about 122.4 k bytes per color. Since the present embodiment uses the recording head shown in FIGS. 2A and 2B, a whole printing length corresponds to 160 nozzles. In practice, however, a maximum length printable by one scan is equivalent to 64 Bk nozzles.

Accordingly, to sufficiently extract even a large character, the storing medium preferably has a capacity corresponding to a multiple of a maximum length printable by one scan. The larger the capacity is, the more the size of an identifiable black character increases. A commonly used size of a black character is 24-point or smaller, and hence a capacity to store about 114 rasters at 360 dpi is needed. That is, the required capacity corresponds to 2 lines of 64 Bk nozzles. The present embodiment uses the storage medium having a capacity to store 384 rasters, equivalent to about 6 lines of 64 nozzles. The capacity is about 1.1 M bytes per color. At Step-2, the number of data for each color is counted for a raster concerned. For this purpose, a bit indicative of whether a raster contains data for each color is set before or after each raster. As a result, it can be determined whether the data existing in the raster is Bk or color or the mixture thereof.

At Step-3, detecting a raster having no data, so-called null raster is performed. If no null raster is detected, data is considered as continuous data representing a continuous image, and hence at Step-6, printing for graphics, 3-pass printing in the present embodiment, is set. If a null raster is present, detecting a next null raster is attempted at Step-4. If the next null raster is not detected at Step-4, printing for graphics is set at Step-6 because no determination can be made within an examined range. If the next null raster is found to be present, whether color data is present between the null rasters is determined at Step-5. If the color data is present, printing for graphics is set at Step-6, considering examined data not to be text.

If the color data is absent, printing for text, 1-pass printing in the present embodiment, is set at Step-7, considering the examined data to be text. In this case, it is possible to make maximal use of 64 Bk nozzles. It is highly likely that the data size is larger than 64 rasters equivalent to 64 Bk nozzles, but the data in the section is recorded at the maximum speed of the recording head.

At Step-8, whether print data is present is determined. If the print data is present, processing returns to Step-1 to repeat again the sequence of detecting a black character and setting a printing method. If the print data is absent, this sequence terminates.

In the present embodiment, a black image which is present between null rasters and which falls within a certain size is extracted as a black character. Hence, even black graphics, which are predicted to assume a lower ratio, are extracted as a black character. However, since this sequence can determine whether black data is present together with color data, a bleeding problem of black and color images does not arise.

Since the present embodiment can handle the print data for a plurality of lines, when printing about one line of data is completed, only the printed data is discarded, and about one line of new data is added for processing. As a result, the occurrence of a problem at the seam of data can be prevented.

Figure 11:
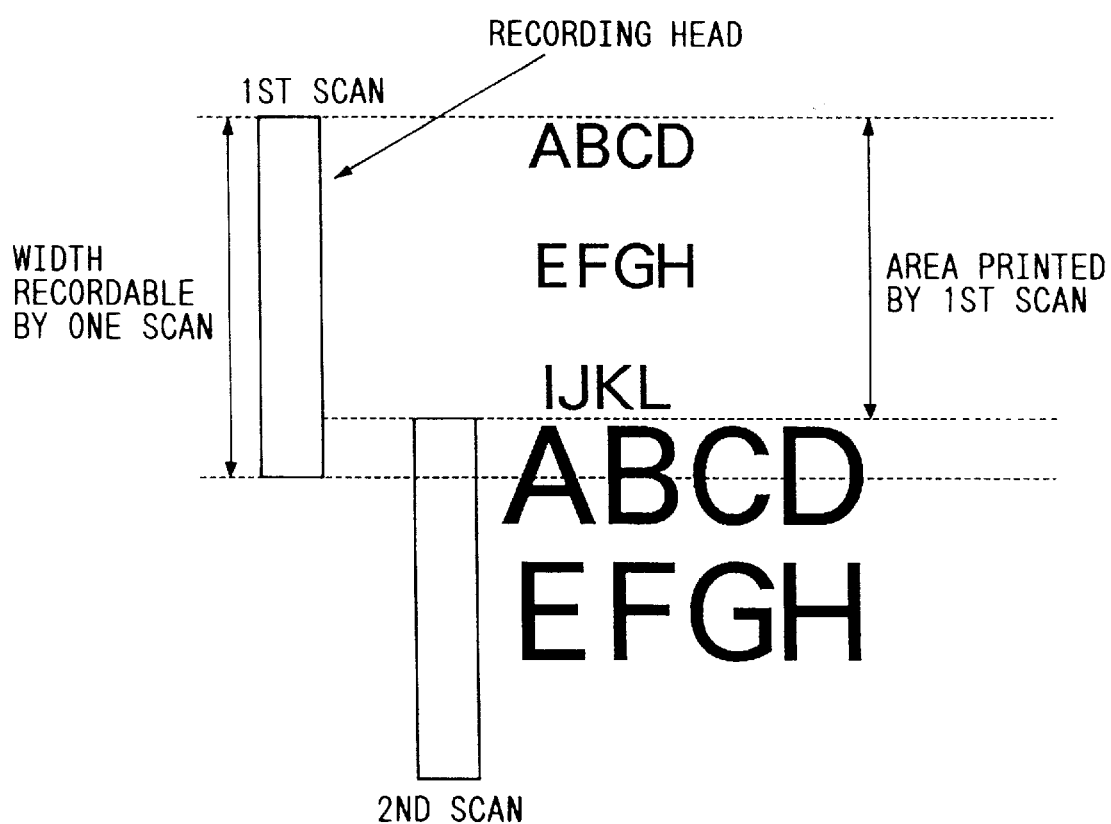
FIG. 11 is a view showing a process of forming black characters in the second embodiment.

Furthermore, as shown in FIG. 11, data extracted as black characters is printed so that the data is completed by one scan. Only the data which can be completed within a print width recordable by one scan is printed by one scan. The data which cannot be completed within the width is recorded by the 2nd scan. Accordingly, the paper feed between the 1st and 2nd scans becomes smaller than a normal feed and is such that next data to be printed comes to the forward end of the recording head. As a result, for a character smaller than a print width recordable by one scan, no connecting stripe is formed within the character. Since the print data for a plurality of lines can be handled, the image can be printed at an optimum feed, and characters having no connecting stripe can be printed at a highest speed.

The operations above can all be controlled by detecting null rasters and by means of the spacing between null rasters. This control is particularly effective for printing as large a character as the print width recordable by one scan. Usually, such a character is recorded by two scans in many cases. However, because of the design to handle the print data for a plurality of lines, such a character can be securely printed by one scan. For a character larger than the print width recordable by one scan, the start position of recording can be brought to the forward end (top end) of the character, and hence it can be recorded by a minimal number of scans.

As described above, the extraction of a black character is effected according to whether a null raster is present or not. If it is determined that a raster has a black character, i.e. black text, printing for text is set for the raster, and printing for graphics is set for other rasters. Thus, the black text can be printed at a high speed, and a one point color image, a dominant form of color images, can be optimally printed with high quality and at a high speed.

As in the first embodiment, by setting an optimal printing method according to a record image, a high quality black record and a high quality color record can be realized in a compatible manner, and a drop of printing speed can be suppressed. In order to extract a larger black character, it is preferable that the storage medium have a capacity corresponding to a multiple of the maximum number of rasters printable by one scan, and the extraction of a black character is performed within the range. As a result, it is possible to make a maximal use of the performance of the recording head and to effect high quality, high-speed recording best suited for a record image.

According to the present embodiment attaching importance to Bk characters, by using a process of detecting a null raster, the emergence of a connecting stripe in one character can be prevented. Since the process of detecting a null raster is to detect whether data is present or not, time required for the detection is short, and hence the detection can be executed concurrently when data is read from the host computer or when raster data is converted to column data or in other similar cases. Also, the present embodiment is easy in electrical construction and advantageous in terms of cost. Since black characters can be detected, the present embodiment is quite effective for one point color images.

The above description of the present embodiment covers the recording head wherein Bk, C, M and Y nozzles shown in FIG. 2B are arranged in a row. However, it is apparent that the present invention is also applicable to such a construction that recording heads of four colors are arranged in the scanning direction of a carriage.

(Third embodiment)

A third embodiment described below is to switch printing methods according to the duty (unit time, the number of image data per unit are) of an image data to be printed.

Bleeding is likely to occur at the boundary between a black image and a color image when both images are high in density and also when the number of driven dots, i.e. a print duty is high. On the contrary, when the print duty is low, the probability of bleeding drops. Also, when only either black or color image is printed, no bleeding takes place.

Accordingly, the present embodiment detects the duty of image data to be printed and sets a printing method according to the detected print duty.

Figure 12:
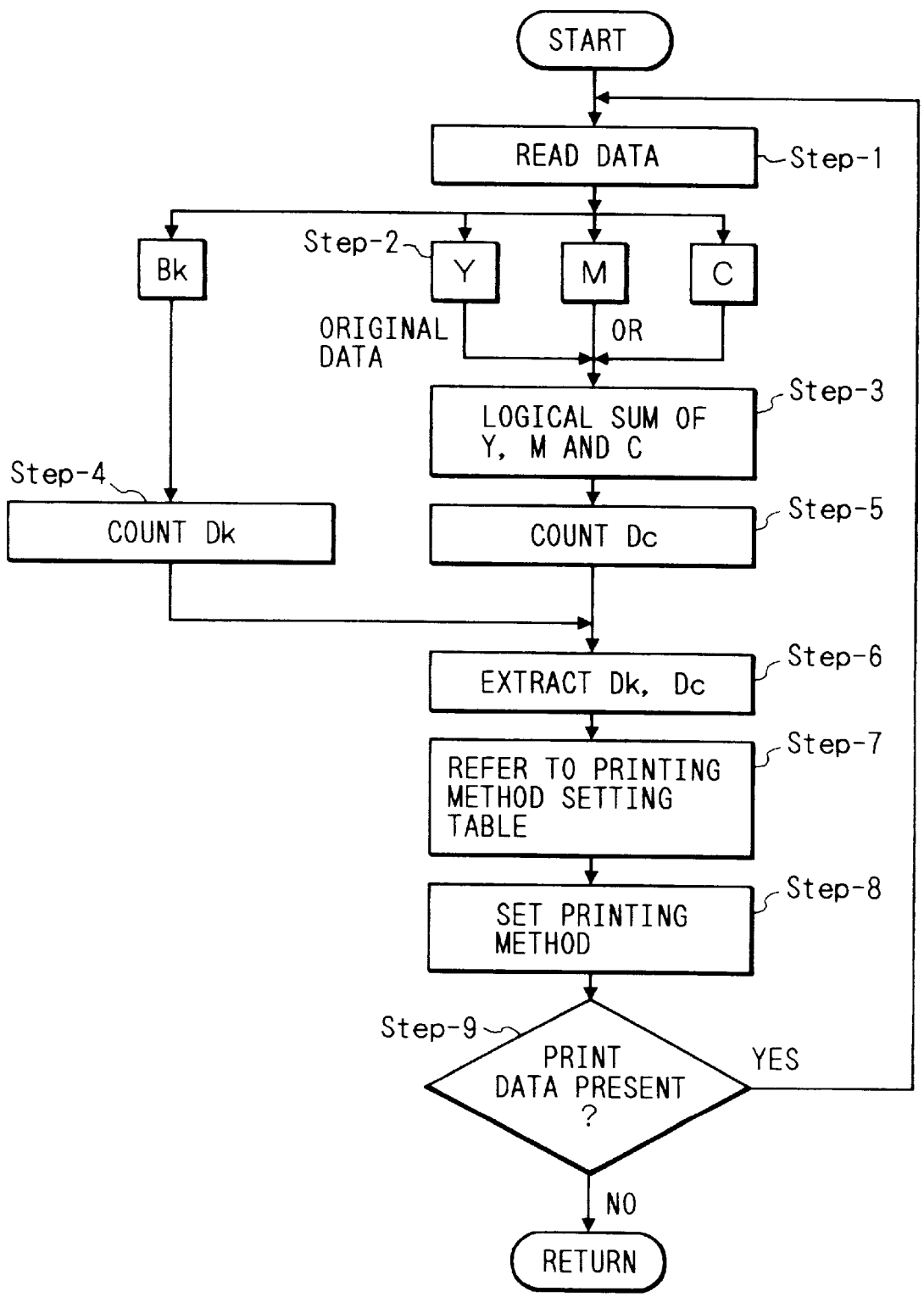
FIG. 12 is a sequence chart executed in a third embodiment for detecting a print duty and for setting a printing method.

FIG. 12 shows a sequence of detecting the print duty and setting a printing method. First, at Step-1, print data is read and then stored temporarily in a storage medium such as RAM or the like. At Step-2, data for each color is fetched. The amount of data to be handled here may be the one corresponding to rasters recordable by one scan, preferably a plurality of lines of data for detecting the state of data ahead to some extent. At Step-3, a logical sum of Y, M and C data is generated. The print duty can be counted independently for each color. In the present embodiment, however, it is counted separately for Bk and color.

At Step-4 and Step-5, the print duty for Bk, Dk, and the print duty for color, Dc, are counted, respectively. The print duty may be counted for a plurality of rasters or for each raster. At Step-6, Dk and Dc are extracted. At Step-7, a printing method setting table shown in FIG. 13 is referred to according to the extracted print duties. At Step-8, a printing method is set based on the result of the reference of Step-7. At Step-9, whether print data is present is determined. If the print data is present, processing returns to Step-1 to repeat again the sequence of detecting the print duty and setting a printing method.

If the print data is absent, this sequence terminates.

According to the printing method setting table shown in FIG. 13, the print duty for Bk, Dk, and the print duty for color, Dc, are divided into 5 stages: 0%, 0 to 25%, 25 to 50%, 50 to 75%, and 75 to 100%; and a printing method (mode) is determined in correspondence with a combination thereof.

For example, if Dc is 0%, it indicates that an image is of black data only and hence that no bleeding occurs regardless of Dk. As a result, mode 1 is selected. Thus, the present embodiment sets 1-pass printing for mode 1. Also, when Dk is 0%, mode 1 is selected. When Dk is 25 to 50% and Dc is 0 to 25%, mode 2 is selected. Although the print duty for color is not so high, there is some potential bleeding.

Thus, the present embodiment sets 2-pass printing for mode 2. When both Bk and color are high in print duty, bleeding is highly likely to occur, and hence mode 3 or 4 is selected. The present embodiment sets 3-pass printing for mode 3 and 4-pass printing for mode 4.

The present embodiment has four printing methods available for setting. Needless to say, various printing methods can be made available for setting according to the construction of a printer body. By rendering printing methods more finely available for setting, more suited printing can be performed according to record images.

As described above, the duty for image data to be printed, i.e. the print duties for Bk and color are detected, and a printing method is set accordingly.

When the print duty is high with both Bk and color, a printing method having a less likelihood of the occurrence of bleeding is selected. When the print duty is low, bleeding itself is hard to take place, and hence a printing method allowing high speed printing is selected. A printing method is selected from the table based on print duties for Bk and color. As a result, an optimal printing method can be set according to the print duty for a print image. Also, a high quality black record and a high quality color record can be realized in a compatible manner, and a drop of printing speed can be suppressed.

(Fourth embodiment)

A fourth embodiment described below is to set a printing method according to the number of colors existing in the same raster as Bk in an image to be printed.

Bleeding is likely to occur at the boundary between a black image and a color image when Bk data and other color data coexist in a probable manner. If only the Bk data exists, no bleeding occurs. Even when some color data coexists, the probability of bleeding is low. However, as existing colors increase, the probability of bleeding also increases. In the present embodiment, a printing method is set according to the number of color data coexisting with the Bk data in a raster.

Figure 14:
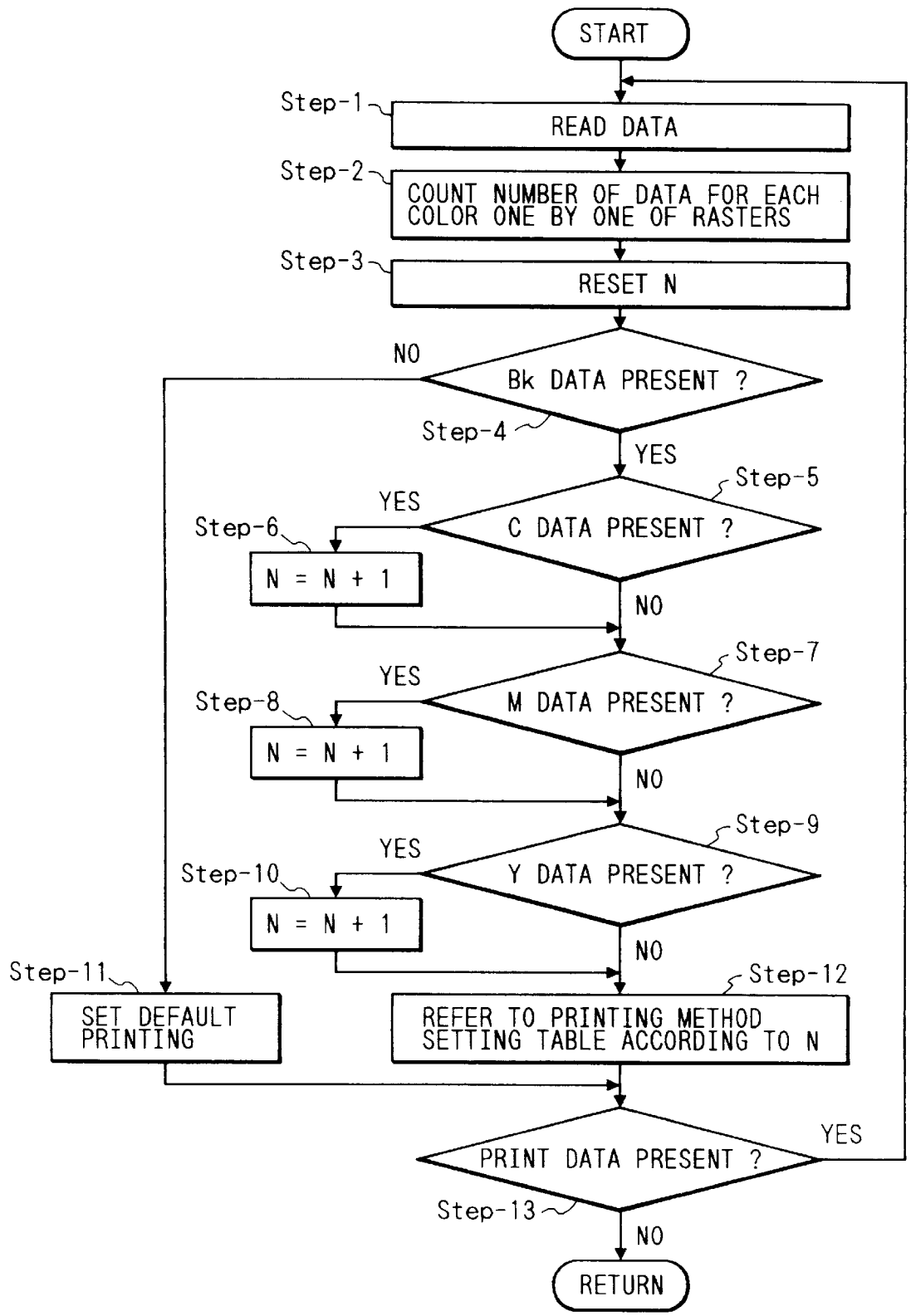
FIG. 14 is a sequence chart executed in a fourth embodiment for detecting the number of colors coexisting with Bk and for setting a printing method.

FIG. 14 shows a sequence of detecting the number of color data coexisting with the Bk data in a raster of a record image and setting a printing method. First, at Step-1, print data is read and then stored temporarily in a storage medium such as RAM or the like. At Step-2, the number of data for each color is counted to see if a raster concerned contains color data. For this purpose, a bit indicative of whether a raster contains data for each color is set before or after each raster. As a result, it can be determined whether the data existing in the raster is Bk or color or the mixture thereof.

At Step-3, the number, N, of colors existing in a raster is reset (N=0). At Step-4, it is determined whether the Bk data is present in the raster. If the Bk data is absent, a default printing method is set at Step-11. Since the Bk data is absent, the raster is either a null raster or a raster containing color data only. Thus, bleeding never occurs. In the present embodiment, the default printing method, 1-pass printing, can be set. If the Bk data is present, it is determined at Step-5 whether cyan data (C data) is present. Subsequently, whether magenta data (M data) is present is determined at Step-7, and whether yellow data (Y data) is present is determined at Step-9. If such color data is present, the number, N, of colors existing in a raster is counted. Accordingly, N is an integer of 0 to 3.

At Step-12, a printing method is set according to N. The printing method conforms to a table shown in FIG. 15. At Step-13, whether print data is present is determined. If the print data is present, processing returns to Step-1 to repeat again the sequence of counting data in a column and setting a printing method. If the print data is absent, this sequence terminates.

In the printing method setting table shown in FIG. 15, the number, N, of colors existing in a column corresponds to a printing method. When the number of colors coexisting with Bk is 0 or 1, mode 1 is elected. In this case, since bleeding is less likely to occur, 1-pass printing is adopted as mode 1 for educing printing time. When N is 2, there is some likelihood of bleeding, and hence mode 2 is selected for setting slightly slower 2-pass printing. When N is 3, i.e. when all three colors of Y, M and C coexist with Bk, mode 3 is selected for setting 3-pass printing. Thus, a printing method can be set according to the number of colors coexisting with Bk. In the present embodiment, a printing method is set as described above, but a printing method may be selected in a different way. Needless to say, multi-pass printing attaching more importance to fixing performance, for example, 4-pass printing, 8-pass printing or the like may be set.

As described above, the number of colors coexisting with Bk in a raster of image data to be printed is detected, and a printing method is set according to the detected number of colors. When Bk and colors coexist, bleeding is more likely to occur. Hence, a printing method is selected according to the number of colors coexisting with Bk. As the number of colors coexisting with Bk increases, multi-pass printing featuring better fixing performance is selected. When the number of colors coexisting with Bk is smaller or when Bk or colors exist independently, bleeding is less likely to occur, and hence a printing method allowing high speed printing is selected.

Thus, according to the present embodiment, an optimal printing method can be set according to the number of colors existing in a raster of a record image. Hence, a high quality black record and a high quality color record can be realized in a compatible manner, and a drop of printing speed can be suppressed. Since the process of counting the number of colors existing in a raster is to detect whether data is present or not, time required for the detection is short, and hence the detection can be executed concurrently when data is read from the host computer or when raster data is converted to column data or in other similar cases. Also, the present embodiment is easy in electrical construction and advantageous in terms of cost.

(Fifth embodiment)

A fifth embodiment described below is to set a printing method according as a color existing in the same raster as Bk is a secondary color or not in an image to be printed.

When an image is to be formed using four colors of Bk, C, M and Y, original image data undergoes a color conversion from three primary colors of R (red), G (green) and B (blue) to their complementary colors of C, M and Y. Moreover, an UCR (Under Color Remove) process is executed to remove components of achromatic colors uncontributive to colors by a certain percentage. To complement the removed achromatic colors, a black generating process is executed to add black by a certain percentage, thereby forming 4-color data. The generated amount of black is determined by a certain percentage of a minimum value of densities of C, M and Y. The percentage is arbitrary and is empirically 70 to 100%. Hence, when three colors of C, M and Y exist, Bk replaces them in most cases. Accordingly, colors existing concurrently with Bk and also being highest in drive count are secondary colors, such as G generated from C and Y, whose drive amount is 200%.

In the present embodiment, a secondary color is detected for setting a printing method. A primary color is 100% in drive amount and is less likely to bleed at the boundary between a Bk image and a color image as compared with a secondary color.

Figure 16:
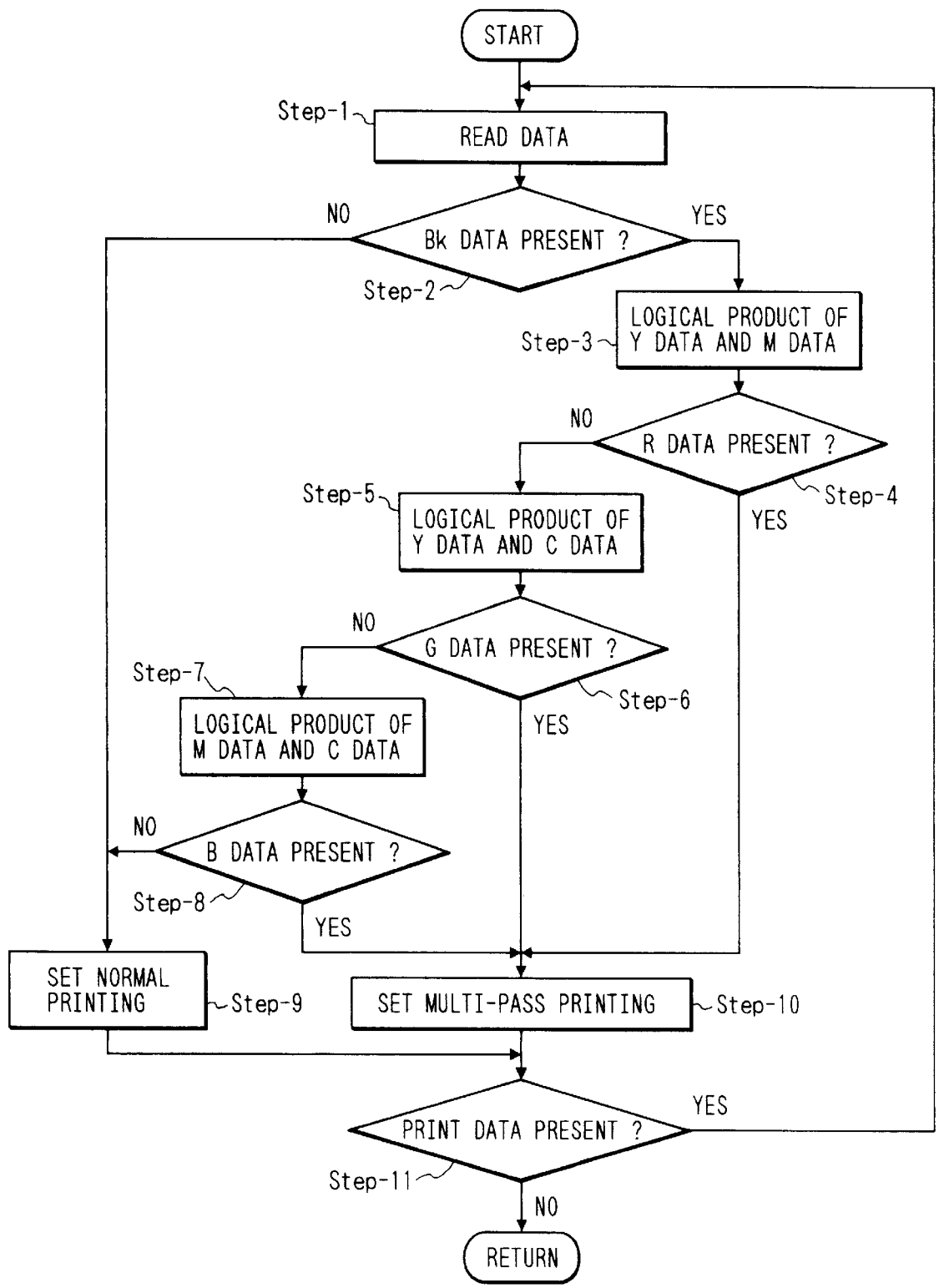
FIG. 16 is a sequence chart executed in a fifth embodiment for detecting a secondary color and for setting a printing method.

FIG. 16 shows a sequence of detecting secondary color data existing in a record image and setting a printing method. First, at Step-1, print data is read and then stored temporarily in a storage medium such as RAM or the like. At Step-2, whether Bk data is present in the read image data is determined. If the Bk data is absent, a color image without Bk or data without an image to be printed is the case, and hence no bleeding occurs. Normal printing, therefore, will do as a printing method, and is set at Step-9. The present embodiment sets 1-pass printing.

If the Bk data is present, the likelihood of bleeding emerges according as a secondary color is present or not. Hence, the detection of a secondary color is executed. First, at Step-3, the logical product of Y data and M data of the read data is generated. This becomes R data of a secondary color. At Step-4, whether the R data is present is determined. If the R data is present, a Bk image and a secondary color image coexist, and hence bleeding is likely to occur. Multi-pass printing, therefore, is set at Step-10. The present embodiment sets 3-pass printing as multi-pass printing. If the R data is absent, the detection of a next secondary color is executed.

At Step-5, the logical product of Y data and C data of the read data is generated. This becomes G data of a secondary color. At Step-6, whether the G data is present is determined. If the G data is present, bleeding is likely to occur. Multi-pass printing, therefore, is set at Step-10. If the G data is absent, the detection of a next secondary color is executed. At Step-7, the logical product of M data and C data of the read data is generated. This becomes B data of a secondary color. At Step-8, whether the B data is present is determined. If the B data is present, bleeding is likely to occur. Multi-pass printing, therefore, is set at Step-10. If the B data is absent, it means that none of three secondary colors are present, and hence normal printing is set at Step-9.

At Step-11, whether print data is present is determined. If the print data is present, processing returns to Step-1 to repeat again the sequence of detecting a secondary color and setting a printing method. If the print data is absent, this sequence terminates. The present embodiment does not limit the amount of data to be handled. This sequence may be executed for each raster or a plurality of rasters.

As described above, whether a secondary color coexists with Bk in image data to be printed is detected, and a printing method is set accordingly. As the density of a color coexisting with Bk becomes higher, bleeding is more likely to occur. When a color coexisting with Bk is a secondary color, multi-pass printing featuring better fixing performance is selected. When a color coexisting with Bk is a primary color or when Bk or colors exist independently, bleeding is less likely to occur, and hence a printing method allowing high speed printing is selected. Thus, an optimal printing method can be set according to whether a secondary color is present or not in a record image. Hence, a high quality black record and a high quality color record can be realized in a compatible manner, and a drop of printing speed can be suppressed.

(Sixth embodiment)

A sixth embodiment described below is to set a printing method according to the density data of an image to be printed.

An ink jet recording method can control the recording of half tones by a dot density control method which represents half tones by controlling the number of record dots having a fixed size per unit area or by a dot diameter control method which represents half tones by controlling the size of a record dot. The latter dot diameter control method involves restrictions because it requires complicated control for finely changing the size of a record dot. Normally, therefore, the former dot density control method is used. Also, when an electrothermal transducer, which is easy to manufacture and allows the implementation of high density and hence high resolution, is used as ink ejecting means, it is difficult to control pressure variations by a large margin. As a result, it is difficult to greatly modify the diameter of a record dot, and hence the dot density control method is practiced.

One of typical binary-coding techniques for representing half tones used in the dot density control method is a systematic dithering technique. This technique involves a problem that the number of tones is limited by a matrix size. That is, for increasing the number of tones, it is necessary to increase the matrix size. However, increasing the matrix size causes the size of one picture element of a record image configured by one matrix to increase, with a resultant problem of a deterioration of resolution.

Another typical binary-coding technique is a conditional determination type dithering technique such as an error diffusion technique or the like. This technique changes a threshold value in consideration of peripheral picture elements of input picture elements, whereas the systematic dithering technique is an independent determination type dithering technique which uses a threshold value unrelated to input picture elements for binary coding. The conditional determination type dithering technique represented by the error diffusion technique provides good compatibility between gradation performance and resolution and has an advantage that more patterns rarely appear in a recorded image when an original image is a print image. On the contrary, the technique has had a problem that graininess tends to be marked in a bright portion of an image with a resultant lower valuation of picture quality. This problem is particularly marked with recording apparatus having a lower recording density.

To make the above-mentioned graininess inconspicuous, a conventional ink jet recording apparatus is equipped with two recording heads to eject light color ink and dark color ink, thus proposing a recording method such that record dots are formed using the light color ink for the bright through half-tone portion of an image and that record dots are formed using the dark color ink for the half-tone through dark portion of an image. A variable density multivalued recording method, which uses a plurality of ink materials having different densities for the same color, improves the gradation performance, particularly of a highlighted portion, even by changing binary to ternary, and allows the attainment of high picture quality by reducing grainy appearance derived from dots. This is because the noise-like appearance of a single dot is removed by driving low density (light color) ink onto a highlighted portion.

The present embodiment sets a printing method according to ink materials used in the variable density multivalued recording method, which uses a plurality of ink materials having different densities for the same color, i.e. according to ink densities, thereby executing optimal printing for an ink density concerned. Since a high-density image is more likely to bleed, multi-pass printing is preferable therefor.

Since a low-density image is less likely to bleed, high speed printing is possible therefor.

Figure 17:
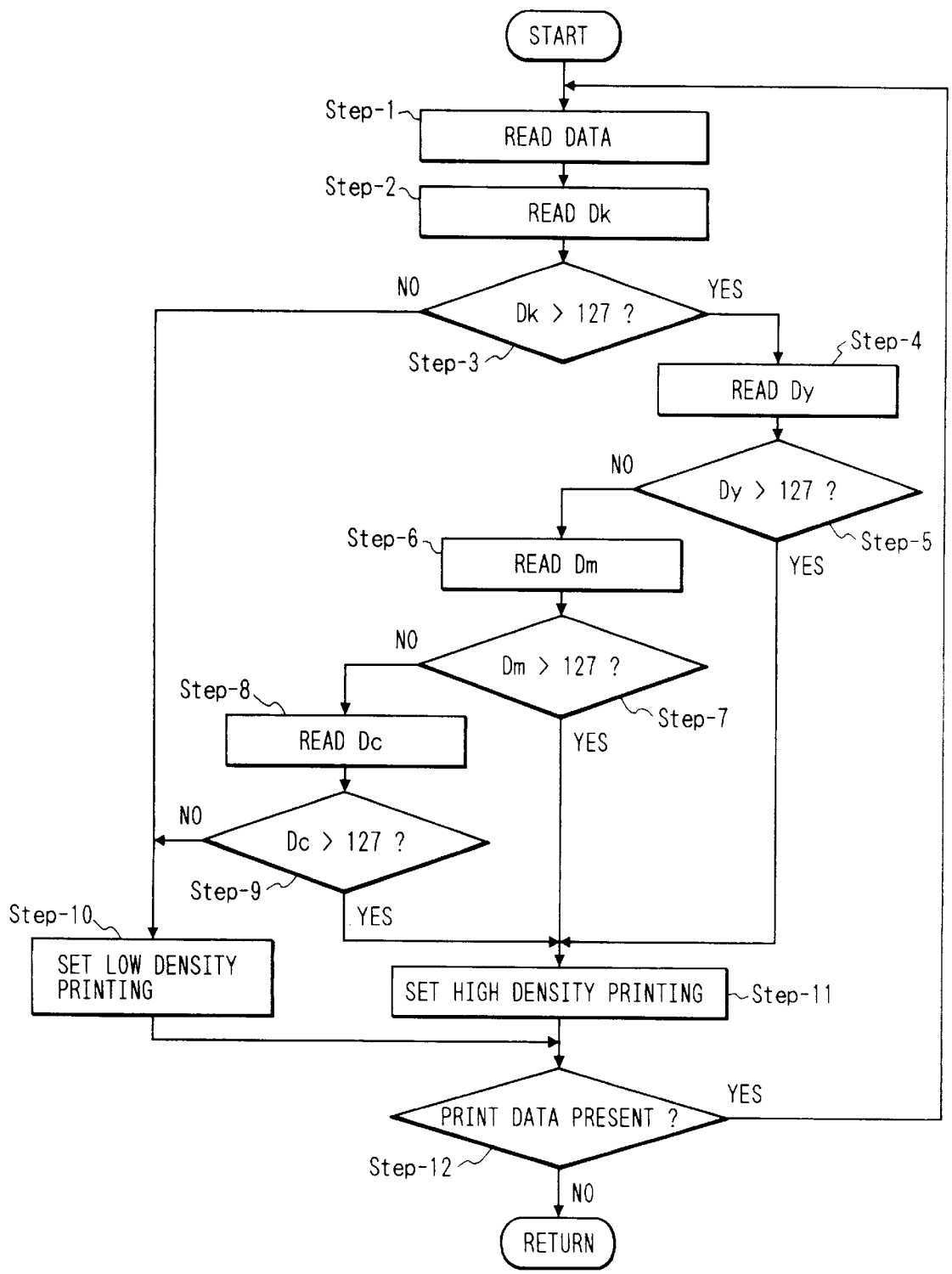
FIG. 17 is a sequence chart executed in a sixth embodiment for detecting multivalued data and for setting a printing method.

FIG. 17 shows a sequence of setting a printing method according to the density of an image to be recorded. The present embodiment handles 8-bit multivalued data for monochrome and density data ranging from 0 to 255. Low density ink is used for density data ranging from 0 to 127 because of low density. High density ink is used for density data ranging from 128 to 255 because of high density. First, at Step-1, print data is read and then stored temporarily in a storage medium such as RAM or the like. At Step-2, the multivalued data of Bk, Dk, is read from the read image data. At Step-3, the density of Bk is examined. If the Bk data is of low density (Dk≦127), low density printing is set at Step-10 because bleeding is less likely to occur regardless of the density of a color image. The present embodiment sets 1-pass printing for low density printing, thereby allowing high speed printing.

If the Bk data is of high density (Dk>127), each color data is examined for density. If all the color data fall in the low density range, low density printing is set. If even one of the color data falls in the high density range, high density printing is set.

First, at Step-4, the multivalued data of Y, Dy, is read. At Step-5, the density of Y is examined. If the Y data is of high density (Dy>127), bleeding is highly likely to occur because Bk is also at high density. Thus, high density printing is set at Step-11. The present embodiment sets 3-pass printing for high density printing. 3-pass printing features the less likelihood of bleeding at the boundary between a black image and a color image and hence allows high quality printing. If the Y data is of low density (Dk≦127), the multivalued data of M, Dm, is read at Step-6. At Step-7, the density of M is examined. If the M data is of high density (Dm>127), bleeding is highly likely to occur because Bk is also at high density. Thus, high density printing is set at Step-li. If the M data is of low density (Dm <127), the multivalued data of M, Dm, is read at Step-8. At Step-9, the density of C is examined. If the C data is of high density (Dc>127), bleeding is highly likely to occur because Bk is also at high density. Thus, high density printing is set at Step-11. If the C data is of low density (Dc≦127), low density printing is set at Step-10 because Y, M and C are at low density in spite of Bk being at high density.

At Step-11, whether print data is present is determined. If the print data is present, processing returns to Step-1 to repeat again the sequence of setting a printing method according to the density of a record image. If the print data is absent, this sequence terminates.

As described above, a printing method is set according to the density of Bk and a color in a multivalued data of a record image. When both Bk and color are high in density, bleeding is more likely to occur. Hence, multi-pass printing featuring better fixing performance is selected as high density printing. When Bk is at low density or when a color is at low density, bleeding is less likely to occur. Hence, high speed printing, here 1-pass printing, is selected as low density printing. Thus, an optimal printing method can be set for an image concerned according to multivalued density data existing in a record image. Accordingly, a high quality black record and a high quality color record can be realized in a compatible manner, and a drop of printing speed can be suppressed.

(Seventh embodiment)

A seventh embodiment described below is to set a printing method according to the transfer rate of an image.

Usually, a recording apparatus does not start printing until image data to be printed is received from a host computer. If data to be printed is not received in time for printing, printing is disabled. The transfer rate of data depends on the capability of the host computer and the form of transfer, but as viewed from a recording apparatus body, it depends highly on the image data to be printed.

For example, in the case of a serial printer, the image data such as graphics or the like is transferred in the form of a bit map, but text data or the like is transferred in the form of a character code in many cases. Data transferred as a code is received faster than data transferred as a bit map. The speed of generating data in a printable form by the recording apparatus depends on the form of data. This speed is hereinafter referred to as transfer rate. Data which is higher in transfer rate keeps the recording apparatus running and in some case may fall in the state of always waiting for the recording apparatus to complete printing. This happens mostly with text data or the like and rarely with the mixture of black and color images.

On the contrary, for data which is lower in transfer rate, the recording apparatus may stop and wait for the data to be transferred thereto in some cases. This happens mostly with image data such as graphics or the like. Black and color images exist together, and bleeding is likely to occur at the boundary therebetween. Paying attention to this transfer rate, the present embodiment sets a printing method according to a transfer rate measured for a certain span.

Figure 18:
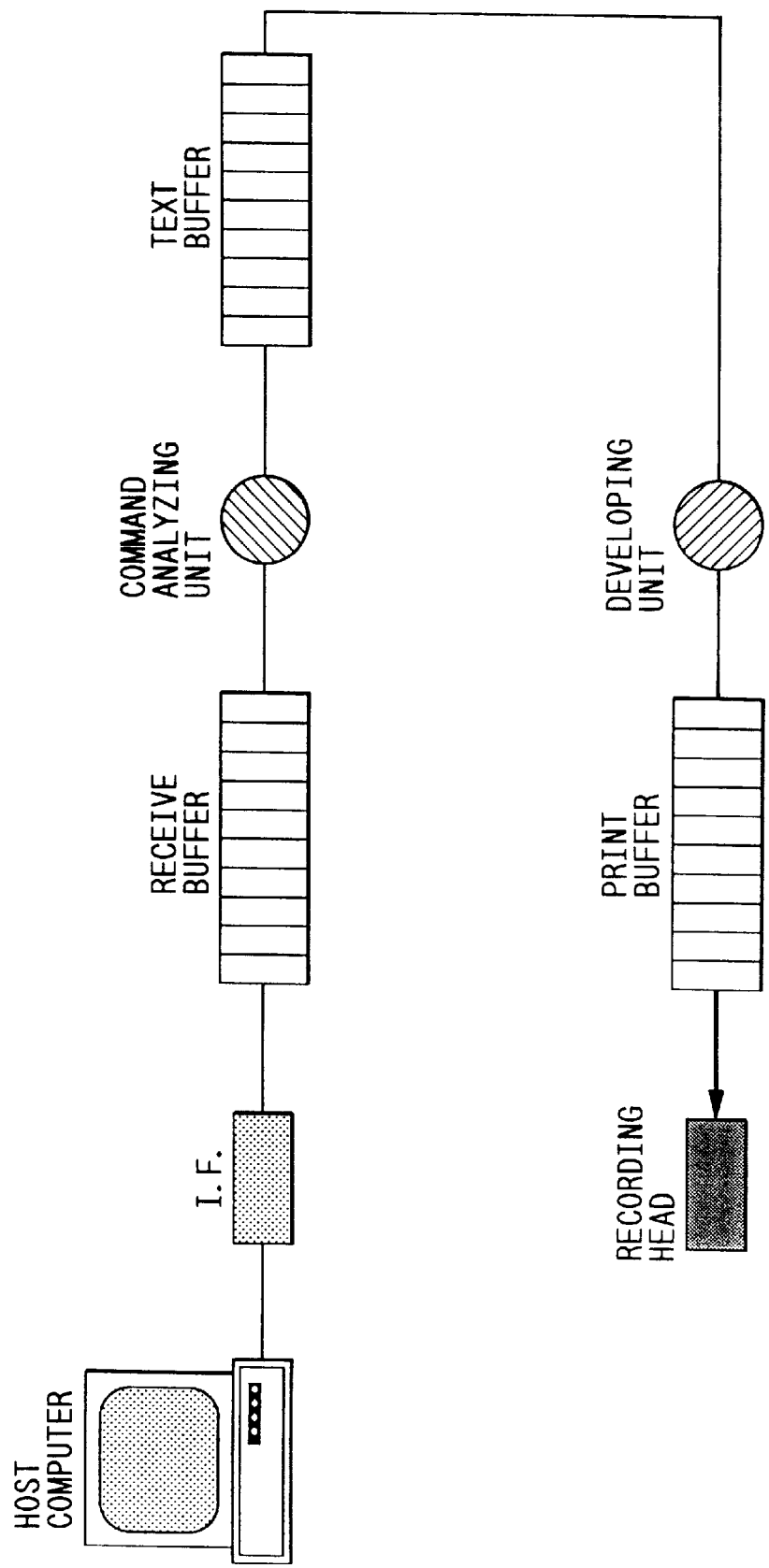
FIG. 18 is a flow diagram of print data.

Next, FIG. 18 is a configuration diagram illustrating the flow of record data inside the recording apparatus. The record data transferred from the host computer is stored in a receive buffer in the recording apparatus via an interface. The receive buffer has a capacity of several kilobytes to several tens of kilobytes. The record data stored in the receive buffer undergoes a command analysis and then is sent to a text buffer. The record data is retained in an intermediate form for one line in the text buffer, and the printing position of each character, type of decoration, size, character (code), font address and the like are added thereto. The capacity of the text buffer depends on a machine model. The text buffer has a capacity corresponding to several lines for a serial printer, and one page for a page printer. The record data stored in the text buffer is developed and then stored in a print buffer in a binary-coded form. Then, a signal of the record data is sent to a recording head for recording. In the present embodiment, for multi-pass printing, a thinning mask is applied to the binary-coded data stored in the print buffer, and then a signal is sent to the recording head. Thus, a mask pattern can also be set after referring to the data in the state of being stored in the print buffer. For some kind of recording apparatus, the text buffer is not provided, and the record data stored in the receive buffer is developed concurrently with command analysis and then stored in the print buffer.

In the present embodiment, the speed of writing data to the print buffer is detected immediately before data is sent to the recording head. The speed is detected by counting the time required for accumulating data of a certain span using a timer held by the CPU. The CPU timer used can manage time at a resolution of several hundreds of nanoseconds to several microseconds. More specifically, the present embodiment can manage time at a resolution of 500 nsec.

In the present embodiment, when the recording head of FIGS. 2A and 2B are used, a printing method is set according to time required for accumulating data of 64 rasters, a maximum amount recordable at a time by one scan.

Figure 19:
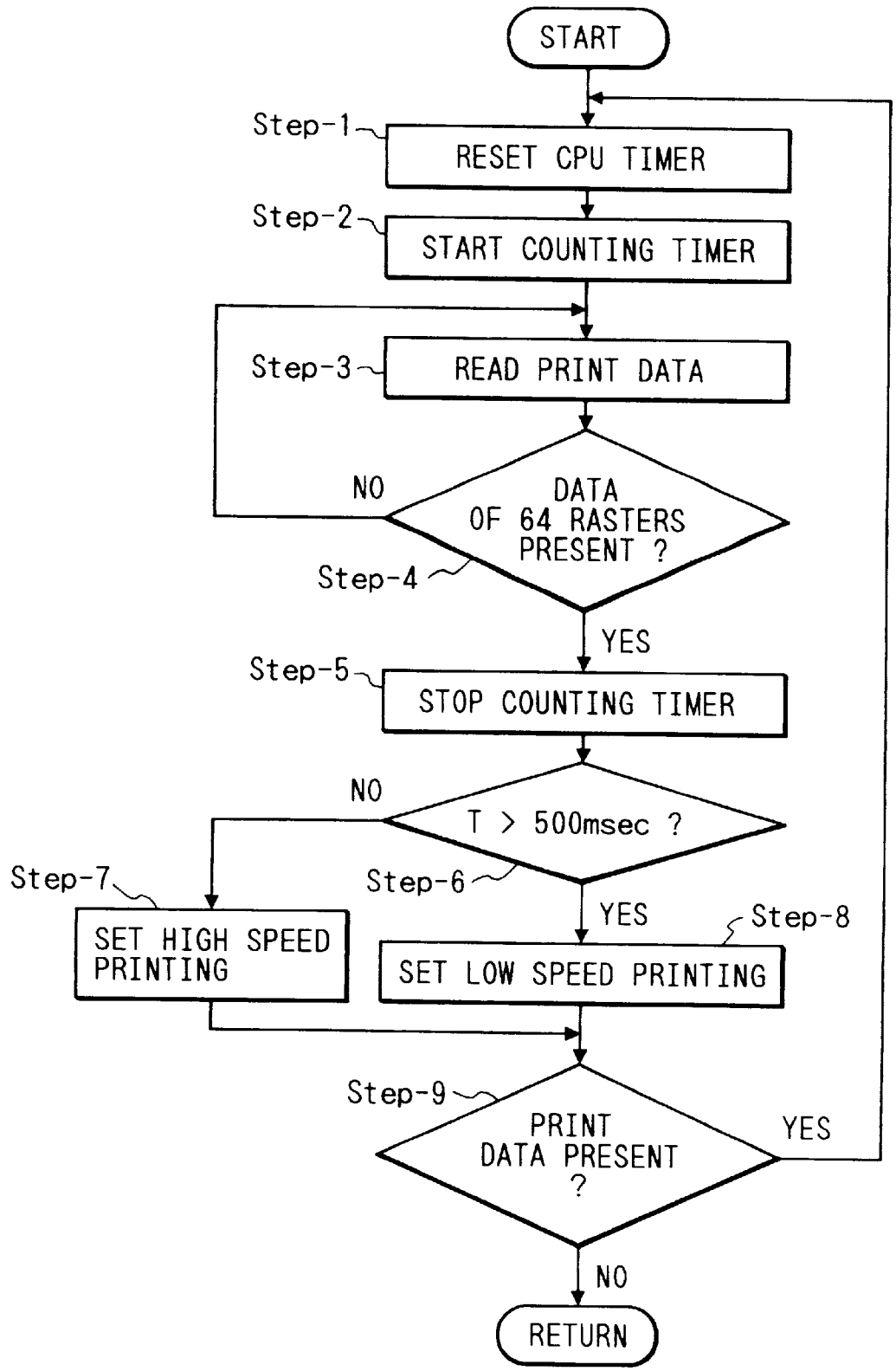
FIG. 19 is a sequence chart executed in a seventh embodiment for detecting a transfer time of print data and for setting a printing method.

FIG. 19 shows a sequence of setting a printing method according to a data transfer rate, i.e. time required for accumulating image data on a record medium. First at Step-1, the timer of the CPU in the recording apparatus body is reset. The present embodiment controls the sequence of setting the printing method under time management by the CPU timer.

As soon as counting the CPU timer starts at Step-2, reading print data starts at Step-3. The data to be printed is sequentially written to the print buffer according to the data flow of FIG. 18. At Step-4, whether data of 64 rasters has accumulated in the print buffer is determined. If not, processing returns to Step-3 to repeat the reading of the print data until data of 64 rasters accumulates.

When data of 64 rasters has accumulated, counting the CPU timer stops at Step-5, and reading the print data also stops. At Step-6, time required for accumulating data of 64 rasters is examined at Step-6. If a timer count, T, is 500 msec or less, the data transfer rate is considered high, and text data involved is considered high. Hence, high speed printing is set at Step-7. If the T value is greater than 500 msec, image data involved such as graphics or the like is considered high. Since the image data is likely to cause bleeding, low speed printing featuring good fixing performance is set at Step-7.

At Step-9, whether print data is present is determined. If the print data is present, processing returns to Step-1 to repeat again the sequence of setting a printing method according to the time required for accumulating data on the storing medium. If the print data is absent, this sequence terminates.

As described above, in the present embodiment, a printing method is set according to the time required for accumulating a fixed amount of image data. If the accumulating time is shorter, the text data involved is considered high, and hence high speed printing is set. If the accumulating time is longer, low speed printing featuring good fixing performance is selected. Thus, the transfer rate of image data is examined by means of time required for accumulating the data in the record medium (buffer memory). An optimal printing method can be set for an image concerned according to the accumulating time. Accordingly, a high quality black record and a high quality color record can be realized in a compatible manner, and a drop of printing speed can be suppressed.

The present embodiment uses time required for accumulating data of 64 rasters for management. The amount of data used for this management can be set in different ways according to the form of the recording head and the configuration of the recording apparatus body. The threshold time for switching printing methods is not limited to 500 msec. It is preferable that the threshold can be set to an optimal value according to the capability of a host computer and the form of transfer. Furthermore, more than two printing methods may be provided for selection according to data accumulating time.

(Eighth embodiment)

According to the embodiments described above, a printing method is set according to the state of image data. Also, patterns of printing methods to be switched may be diversified for selection. The eighth embodiment described below is to set a printing method according to recording media. The description below covers the case of combination with the third embodiment.

FIG. 20 shows an example of a printing method setting table according to recording media and modes appearing in the one according to printing duty shown in FIG. 13. In FIG. 20, as the mode shifts from mode 1 toward mode 4, an image becomes more likely to bleed. In mode 1, an image is dominated by black characters, or an image is in black or color only, and hence no bleeding occurs. When plain paper is used, as the likelihood of bleeding increases, the printing method changes sequentially from 1-pass through 4-pass. As the number of passes increases, the likelihood of bleeding decreases.

For coated paper, bleeding is less likely to occur even when a high density image is recorded by high speed printing. Since printed ink permeates into a coating layer quickly, bleeding or the like is less likely to occur even when a high density image is recorded. Hence, 1-pass printing is set for modes 1 and 2, and 2-pass printing is set for modes 3 and 4. For OHP paper, bleeding is less likely to occur than plain paper. However, since OHP paper is used for presentation or the like in many cases, 4-pass printing is set for all modes to provide highest quality images. Lastly, for other recording media, whether bleeding is likely to occur or what image quality is required is unknown. Accordingly, to provide a printing method which is less likely to cause bleeding as a whole and whose printing speed does not drop excessively, 2-pass printing is set for modes 1 and 2, and 3-pass printing is set for modes 3 and 4.

Thus, an optimal printing method can be set for a recording medium concerned by switching patterns of printing methods according to recording media. Furthermore, the present embodiment can be combined with all foregoing embodiments for effectively setting an optimal printing method. Also, the present invention can set a further optimal printing method by combining two or more of the first through eighth embodiments.

(Others)

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for a plurality of electrothermal transducers, and to the structure disclosed in Japanese Laid-Open Patent Application No. 59-138461 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be a plurality of heads corresponding to the plurality of ink materials having different recording colors or densities. The present invention is effectively applied to an apparatus having at least one of a monochromatic mode mainly with black, multi-color with different color ink materials and/or a full-color mode using the mixture of the colors, which may be an integrally formed recording unit or a combination of a plurality of recording heads.

Furthermore, in the foregoing embodiments, the ink has been liquid. It also may be ink material which is solid below the room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is applied. The present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material.

The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

According to the present invention, it is possible to set an optimal printing method for record image data. Thus, it is possible to remove an image related problem such as bleeding or the like at the boundary between color and black image areas, thereby realizing a high quality black record with less feathering in a black image area and a high quality color record in a compatible manner and minimizing a drop of printing speed. Also, it is possible to make maximal use of performance of the recording head, thereby effecting optimal high quality, high speed recording for a record image.

What is claimed is:

1. A color ink jet recording method which uses black ink and color ink of a plurality of colors. having a different characteristic of permeation into a recording medium from the black ink, and which records a color image on the recording medium according to record data, comprising the steps of:

determining whether a degree of closeness between a black image and a color image is high or not; and recording an image at a speed according to the degree determined, wherein in said recording step, the image is recorded at a relatively low speed for an area having a high degree of closeness, and the image is recorded at a relatively high speed for an area having a low degree of closeness.

2. A color ink jet recording method according to claim 1, wherein the image is recorded by scanning a recording head a number of times, and wherein during said recording step a number of times of scanning the recording head to record the image at the relatively low speed is greater than a number of times of scanning the recording head to record the image at the relatively high speed.

3. A color ink jet recording method which uses black ink and color ink of a plurality of colors, having a different characteristic of permeation into a recording medium from the black ink, and which records a color image on the recording medium according to record data, comprising the steps of:

determining whether or not an area is high in a degree of bleeding between a black image and a color image; and recording an image at a speed according to the degree determined, wherein in said recording step, the image is recorded at a relatively low speed for an area having a high degree of bleeding, and the image is recorded at a relatively high speed for an area having a low degree of bleeding.

4. A color ink jet recording method according to claim 3, wherein the image is recorded by scanning a recording head a number of times, and wherein during said recording step a number of times of scanning the recording head to record the image at the relatively low speed is greater than a number of times of scanning the recording head to record the image at the relatively high speed.

5. A color ink jet recording method which uses black ink and color ink of a plurality of colors, having a different characteristic of permeation into a recording medium from the black ink, and which records a color image on the recording medium according to record data, comprising the steps of:

detecting a boundary between a black image and a color image; and recording an image at a speed according to the detected presence/absence of the boundary, wherein in said recording step the image is recorded at a relatively low speed for an area where a boundary has been detected, and the image is recorded at a relatively high speed for an area where a boundary has not been detected.

6. A color ink jet recording method according to claim 5, wherein the image is recorded by scanning a recording head a number of times, and wherein during said recording step a number of times of scanning the recording head to record the image at the relatively low speed is greater than a number of times of scanning the recording head to record the image at the relatively high speed.

7. A color ink jet recording method which uses black ink and color ink of a plurality of colors, having a different characteristic of permeation into a recording medium from the black ink, and which records a color image on the recording medium according to record data, comprising the steps of:

detecting a black character portion; and recording an image at a speed according to the detected presence/absence of a black character portion, wherein in said recording step, the image is recorded at a relatively high speed for an area where a black character portion has been detected, and the image is recorded at a relatively low speed for an area where a black character portion has not been detected.

8. A color ink jet recording method according to claim 7, wherein the image is recorded by scanning a recording head a number of times, and wherein during said recording step a number of times of scanning the recording head to record the image at the relatively low speed is greater than a number of times of scanning the recording head to record the image at the relatively high speed.

9. A color ink jet recording method according to claim 4, wherein in said detecting step, a black character portion is detected by detecting a null raster.

10. A color ink jet recording method according to claim 4, wherein in said detecting step, a black character portion is detected over an area wider than an area recordable by one scan of a recording head.

11. A color ink jet recording method according to claim 4, wherein in said detecting step, a black character portion is detected over an area wider than a multiple of an area recordable by one scan of a recording head.

12. A color ink jet recording method which uses black ink and color ink of a plurality of colors, having a different characteristic of permeation into a recording medium from the black ink, and which records a color image on the recording medium according to record data, comprising the steps of:

detecting a duty of record data; and recording an image at a speed according to a detected duty, wherein in said recording step, the image is recorded at a relatively high speed for an area having a low detected duty, and the image is recorded at a relatively low speed Nor an area having a high detected duty.

13. A color ink jet recording method according to claim 12, wherein the image is recorded by scanning a recording head a number of times, and wherein during said recording step a number of times of scanning the recording head to record the image at the relatively low speed is greater than a number of times of scanning the recording head to record the image at the relatively high speed.

14. A color ink jet recording method according to claim 8, wherein in said duty detecting step, duty of record data corresponding to each of black ink and color ink is detected.

15. A color ink jet recording method which uses black ink and color ink of a plurality of colors, having a different characteristic of permeation into a recording medium from the black ink, and which records a color image on the recording medium according to record data, comprising the steps of:

detecting a number of colors coexisting with a black image; and recording an image at a speed according to the detected number of colors, wherein in said recording step, the image is recorded at a relatively high speed for an area having a small number of detected colors, and the image is recorded at a relatively low speed for an area having a large number of detected colors.

16. A color ink jet recording method according to claim 15, wherein the image is recorded by scanning a recording head a number of times, and wherein during said recording step a number of times of scanning the recording head to record the image at the relatively low speed is greater than a number of times of scanning the recording head to record the image at the relatively high speed.

17. A color ink jet recording method which uses black ink and color ink of a plurality of colors, having a different characteristic of permeation into a recording medium from the black ink, and which records a color image on the recording medium according to record data, comprising the steps of:

detecting whether a black image and a secondary color image coexist; and recording an image at a speed according to the detected presence/absence of coexistence, wherein in said recording step, the image is recorded at a relatively low speed for an area where coexistence has been detected, and the image is recorded at a relatively high speed for an area where coexistence has not been detected.

18. A color ink jet recording method according to claim 17, wherein the image is recorded by scanning a recording head a number of times, and wherein during said recording step a number of times of scanning the recording head to record the image at the relatively low speed is greater than a number of times of scanning the recording head to record the image at the relatively high speed.

19. A color ink jet recording method which uses black ink and color ink of a plurality of colors, having a different characteristic of permeation into a recording medium from the black ink, and which records a color image on the recording medium according to record data, comprising the steps of:

detecting multivalued data of a record image; and recording an image at a speed according to the detected presence/absence of multivalued data, wherein in said recording step, the image is recorded at a relatively low speed for an area where multivalued data has been detected, and the image is recorded at a relatively high speed for an area where multivalued data has not been detected.

20. A color ink jet recording method according to claim 19, wherein the image is recorded by scanning a recording head a number of times, and wherein during said recording step a number of times of scanning the recording head to record the image at the relatively low speed is greater than a number of times of scanning the recording head to record the image at the relatively high speed.

21. A color ink jet recording method which uses black ink and color ink of a plurality of colors, having a different characteristic of permeation into a recording medium from the black ink, and which records a color image on the recording medium according to record data, comprising the steps of:

detecting a transfer time of record data; and recording an image at a speed according to a detected transfer time, wherein in said recording step, the image is recorded at a relatively low speed for an area where the detected transfer time is long, and the image is recorded at a relatively high speed for an area where the detected transfer time is short.

22. A color ink jet recording method according to claim 21, wherein the image is recorded by scanning a recording head a number of times, and wherein during said recording step a number of times of scanning the recording head to record the image at the relatively low speed is greater than a number of times of scanning the recording head to record the image at the relatively high speed.

23. A color ink jet recording method according to claim 21, wherein in said detecting step, the transfer time of record data is detected by a CPU timer of a recording apparatus body.

24. A color ink jet recording method according to any one of claims 1, 3, 5, 7, 12, 15, 17, 19, and 21, wherein in said recording step, the image is recorded at a speed according to a surface coating of the recording medium.

25. A color ink jet recording method according to any of claims 1, 3, 5, 7, 12, 15, 17, 19, and 21, wherein in said recording step, relatively high speed recording is executed— using 1-pass recording which completes recording using a first area of a recording head in a predetermined area by making the recording head scan one time, and relatively low speed recording is executed using a second area of the recording head using multi-pass recording which completes recording in a predetermined area by making the recording head scan a plurality of times.

26. A color ink jet recording method according to any one of claims 1, 3, 5, 7, 12, 15, 17, 19, and 21, wherein at said recording step, thermal energy is used to eject ink for recording.

27. A color ink jet recording apparatus which uses black ink and color ink of a plurality of colors, having a different characteristic of permeation into a recording medium from the black ink, and which records a color image on the recording medium according to record data, comprising:

determining means for determining whether a degree of closeness between a black image and a color image is high or not; and recording control means for recording an image at a speed according to the degree determined, wherein the image is recorded at a relatively low speed for an area having a high degree of closeness, and the image is recorded at a relatively high speed for an area having a low decree of closeness.

28. A color ink jet recording apparatus which uses black ink and color ink of a plurality of colors, having a different characteristic of permeation into a recording medium from the black ink, and which records a color image on the recording medium according to record data, comprising:

determining means for determining whether or not an area is high in a degree of bleeding between a black image and a color image; and recording control means for recording an image at a speed according to the degree determined, wherein the image is recorded at a relatively low speed for an area having a high degree of bleeding, and the image is recorded at a relatively high speed for an area having a low degree of bleeding.

29. A color ink jet recording apparatus which uses black ink and color ink of a plurality of colors, having a different characteristic of permeation into a recording medium from the black ink, and which records a color image on the recording medium according to record data, comprising:

detecting means for detecting a boundary between a black image and a color image; and recording control means for recording an image at a speed according to the detected presence/absence of a boundary, wherein the image is recorded at a relatively low speed for an area where a boundary has been detected, and the image is recorded at a relatively high speed for an area where a boundary has not been detected.

30. A color ink jet recording apparatus which uses black ink and color ink of a plurality of colors, having a different characteristic of permeation into a recording medium from the black ink, and which records a color image on the recording medium according to record data, comprising:

detecting means for detecting a black character portion; and recording control means for recording an image at a speed according to the detected presence/absence of a black character portion, wherein the image is recorded at a relatively high speed for an area where a black character portion has been detected, and the image is recorded at a relatively low speed for an area where a black character portion has not been detected.

31. A color ink jet recording apparatus which uses black ink and color ink of a plurality of colors, having a different characteristic of permeation into a recording medium from the black ink, and which records a color image on the recording medium according to record data, comprising:

detecting means for detecting a duty of record data; and recording control means for recording an image at a speed according to a detected duty, wherein the image is recorded at a relatively high speed for an area having a low detected duty, and the image is recorded at a relatively low speed for an area having a high detected duty.

32. A color ink jet recording apparatus which uses black ink and color ink of a plurality of colors, having a different characteristic of permeation into a recording medium from the black ink, and which records a color image on the recording medium according to record data, comprising:

detecting means for detecting a number of colors coexisting with a black image; and recording control means for recording an image at a speed according to the detected number of colors, wherein the image is recorded at a relatively high speed for an area having a small number of detected colors, and the image is recorded at a relatively low speed for an area having a large number of detected colors.

33. A color ink jet recording apparatus which uses black ink and color ink of a plurality of colors, having a different characteristic of permeation into a recording medium from the black ink, and which records a color image on the recording medium according to record data, comprising:

detecting means for detecting whether a black image and a secondary color image coexist; and recording control means for recording an image at a speed according to the detected presence/absence of coexistence, wherein the image is recorded at a relatively low speed for an area where coexistence has been detected, and the image is recorded at a relatively high speed for an area where coexistence has not been detected.

34. A color ink jet recording apparatus which uses black ink and color ink of a plurality of colors, having a different characteristic of permeation into a recording medium from the black ink, and which records a color image on the recording medium according to record data, comprising:

detecting means for detecting multivalued data of a record image; and recording control means for recording an image at a speed according to the detected presence/absence of multivalued data, wherein the image is recorded at a relatively low speed for an area where multivalued data has been detected, and the image is recorded at a relatively high speed for an area where multivalued data has not been detected.

35. A color ink jet recording apparatus which uses black ink and color ink of a plurality of colors, having a different characteristic of permeation into a recording medium from the black ink, and which records a color image on the recording medium according to record data, comprising:

detecting means for detecting a transfer time of record data; and recording control means for recording an image at a speed according to a detected transfer times wherein the image is recorded at a relatively low speed for an area where the detected transfer time is long, and the image is recorded at a relatively high speed for an area where the detected transfer time is short.

36. A color ink jet recording apparatus according to any one of claims 27 to 35, wherein said recording control means executes relatively high speed recording using 1-pass recording which completes recording using a first area of a recording head in a predetermined area by making the recording head scan one time, and relatively low speed recording using multi-pass recording which completes recording using a second area of the recording head in a predetermined area by making the recording head scan a plurality of times.

37. A color ink jet recording apparatus according to any one of claim 27 to 35, wherein said recording control means uses thermal energy to eject ink for recording.

38. An ink jet recording apparatus for forming images by scanning a recording head and ejecting plural kinds of ink from the recording head onto a recording medium in accordance with record data, said recording apparatus comprising:

detecting means for detecting a boundary between an image formed by a first ink and an image formed by a second ink; and recording control means for recording an image by scanning the recording head a number of times corresponding to the detection of the boundary by said detecting means, wherein a number of times of scanning the recording head in accordance with an area where the boundary is detected by said detecting means is greater than a number of times of scanning the recording head in accordance with an area where the boundary is not detected by said detecting means.

39. An ink jet recording apparatus which uses a first ink and a second ink having a different characteristic of permeation into a recording medium from that of the first ink, said apparatus scanning a recording head and recording images on the recording medium in accordance with record data, said apparatus comprising:

determining means for determining whether a degree of closeness between an image formed by the first ink and an image formed by the second ink is high or not; and recording control means for recording an image by scanning the recording head a number of times corresponding to the degree of closeness determined by said determining means, wherein a number of times of scanning the recording head in accordance with an area where the degree of closeness is high is greater than a number of times of scanning the recording head in accordance with an area where the degree of closeness is low.

40. An apparatus according to claim 39, wherein the recording head records an image by ejecting ink using thermal energy.

41. An ink jet recording apparatus which uses a first ink and a second ink having a different characteristic of permeation into a recording medium from that of the first ink, said apparatus scanning a recording head and recording images on the recording medium in accordance with record data, said apparatus comprising:

determining means for determining whether a degree of bleeding between an image formed by the first ink and an image formed by the second ink is high or not; and recording control means for recording an image by scanning the recording head a number of times corresponding to the degree of bleeding determined by said determining means, wherein a number of times of scanning the recording head in accordance with an area where the degree of bleeding is high is greater than a number of times of scanning the recording head in accordance with an area where the degree of bleeding is low.

42. An apparatus according to claim 41, wherein the recording head records an image by ejecting ink using thermal energy.

43. An ink jet recording apparatus which uses a first ink and a second ink having a different characteristic of permeation into a recording medium from that of the first ink, said apparatus scanning a recording head and recording images on the recording medium in accordance with record data, said apparatus comprising:

detecting means for detecting a boundary between an image formed by the first ink and an image formed by the second ink; and recording control means for recording an image by scanning the recording head a number of times corresponding to detection of the boundary by said detecting means, wherein a number of times of scanning the recording head in accordance with an area where the boundary is detected by said detecting means is greater than a number of times of scanning the recording head corresponding to an area where the boundary is not detected by said detecting means.

44. An apparatus according to claim 43, wherein the recording head records an image by ejecting ink using thermal energy.

45. An ink jet recording apparatus which uses a first ink and a second ink having a different characteristic of permeation into a recording medium from that of the first ink for recording a character portion of an image, said apparatus scanning a recording head and recording the image on the recording medium in accordance with record data, said apparatus comprising:

detecting means for detecting a character portion of an image; and recording control means for recording the image by scanning the recording head a number of times corresponding to detection of the character portion of the image by said detecting means, wherein a number of times of scanning the recording head in accordance with an area where the character portion is not detected by said detecting means is greater than a number of times of scanning the recording head in accordance with an area where the character portion is detected by said detecting means.

46. An apparatus according to claim 45, wherein the recording head records an image by ejecting ink using thermal energy.

47. An ink jet recording apparatus which uses a first ink and a second ink having a different characteristic of permeation into a recording medium from that of the first ink, said apparatus scanning a recording head and recording images on the recording medium in accordance with record data, said apparatus comprising:

detecting means for detecting a print duty of the record data; and recording control means for controlling recording of an image by scanning the recording head a number of times corresponding to the print duty detected by said detecting means, wherein a number of times of scanning the recording head in accordance with an area where the detected duty is high is greater than a number of times of scanning the recording head in accordance with an area where the detected duty is low.

48. An apparatus according to claim 47, wherein the recording head records an image by ejecting ink using thermal energy.

49. An ink jet recording apparatus which uses a first ink and second ink, the second ink being color ink comprising a plurality of colors and having a different characteristic of permeation into a recording medium from that of the first ink, said apparatus scanning a recording head and recording an image on the recording medium in accordance with record data, said apparatus comprising:

detecting means for detecting a number of colors of an image to be printed by the second ink; and recording control means for recording an image by scanning the recording head a number of times corresponding to the number of colors detected by said detecting means, wherein a number of times of scanning the recording head in accordance with an area where the detected number of colors is large is greater than a number of times of scanning the recording head in accordance with an area where the detected number of colors is small.

50. An apparatus according to claim 49, wherein the recording head records an image by ejecting ink using thermal energy.

51. An ink jet recording apparatus which uses a first ink and second ink, the second ink being color ink of a plurality of colors and having a different characteristic of permeation into a recording medium from that of the first ink, said apparatus scanning a recording head and recording images on the recording medium in accordance with record data, said apparatus comprising:

detecting means for detecting whether an image recorded by the first ink, and a secondary color image recorded by the second ink, coexist; and recording control means for controlling recording of an image by scanning the recording head a number of times corresponding to a detection result of said detecting means, wherein a number of times of scanning the recording head in accordance with an area where coexistence is detected by said detecting means is greater than a number of times of scanning the recording head in accordance with an area where the coexistence is not detected by said detecting means.

52. An apparatus according to claim 51, wherein the recording head records an image by ejecting ink using thermal energy.

53. An ink jet recording apparatus which uses a first ink and a second ink having a different characteristic of permeation into a recording medium from that of the first ink, said apparatus scanning a recording head to record images on the recording medium in accordance with record data, said apparatus comprising:

detecting means for detecting multivalued data of a record image; and recording control means for recording an image by scanning the recording head a number of times corresponding to a detection result of the multivalued data by said detecting means, wherein a number of times of scanning the recording head in accordance with an area where the multivalued data is detected by said detecting means is greater than a number of times of scanning the recording head in accordance with an area where the multivalued data is not detected by said detecting means.

54. An apparatus according to claim 53, wherein the recording head records an image by ejecting ink using thermal energy.

55. An ink jet recording apparatus which uses a first ink and a second ink having a different characteristic of permeation into a recording medium from that of the first ink, said apparatus scanning a recording head and recording an image on the recording medium in accordance with record data, said apparatus comprising:

detecting means for detecting a transfer time of record data; and recording control means for recording an image by scanning the recording head a number of times corresponding to the transfer time detected by said detecting means, wherein a number of times of scanning the recording head in accordance with an area where the detected transfer time is long is greater than a number of times of scanning the recording head in accordance with an area where the detected transfer time is short.

56. An apparatus according to claim 55, wherein the recording head records an image by ejecting ink using thermal energy.

* * * * *

UNITED STATES PATENT AND TRADEMARK OFFICE
CERTIFICATE OF CORRECTION

PATENT NO. : 6,164,756
DATED : December 26, 2000
INVENTOR(S) : Kichiro Takahashi et al.

It is certified that error appears in the above-identified patent and that said Letters Patent is hereby corrected as shown below:

Title page,
Item [56], References Cited, FOREIGN PATENT DOCUMENTS,
"3146355                              -- 3-146355
 4158049      should read     4-158049
 6047927                           6-47927
 6087222"                          6-87222 --.

Column 14,
Line 22, close up right margin (no new paragraph);
Line 23, close up left margin (no new paragraph);
Line 62, close up right margin (no new paragraph);
Line 63, close up left margin (no new paragraph).

Column 15,
Line 9, close up right margin (no new paragraph);
Line 10, close up left margin (no new paragraph).

Column 16,
Line 4, "educing" should read -- reducing --.

Column 20,
Line 67, close up right margin (no new paragraph).

Colum 21,
Line 1, close up left margin (no new paragraph);

Column 25,
Line 36, "claim 4," should read -- claim 7, --;
Line 39, "claim 4," should read -- claim 7, --;
Line 43, "claim 4," should read -- claim 7, --;
Line 60, "Nor" should read -- for --.

Column 26,
Line 1, "claim 8," should read -- claim 12, --.

Column 27,
Line 33, "executed-" should read -- executed --;
Line 59, "decree" should read -- degree --.

Column 29,
Line 33, "times" should read -- time, --.

UNITED STATES PATENT AND TRADEMARK OFFICE
CERTIFICATE OF CORRECTION

PATENT NO.    : 6,164,756
DATED         : December 26, 2000
INVENTOR(S)   : Kichiro Takahashi et al.

It is certified that error appears in the above-identified patent and that said Letters Patent is hereby corrected as shown below:

Column 32,
Line 65, insert attached claims 57-64.

-- 57. A color ink jet recording method which uses a first ink and a second ink, having a different characteristic of permeation into a recording medium from the first ink, and which records an image on the recording medium according to recording data, said method comprising the steps of:

detecting whether an image formed by the first ink and an image formed by the second ink coexists in an area; and recording an image at a speed according to the result of said detecting step, wherein in said recording step, the image is recorded at a relatively low speed for an area where coexistence has been detected, and the image is recorded at a relatively high speed for an area where coexistence has not been detected.

58. A color ink jet recording apparatus which uses a first ink and a second ink having a different characteristic of permeation into a recording medium from the first ink, and which records an image on the recording medium according to record data, said apparatus comprising:

detecting means for detecting whether an image formed by the first ink and an image formed by the second ink coexist in an area; and recording control means for recording an image at a speed according to the result detected by said detecting means, wherein the image is recorded at a relatively low speed for an area where coexistence has been detected, and the image is recorded at a relatively high speed for an area where coexistence has not been detected.

UNITED STATES PATENT AND TRADEMARK OFFICE
CERTIFICATE OF CORRECTION

PATENT NO.   : 6,164,756
DATED        : December 26, 2000
INVENTOR(S)  : Kichiro Takahashi et al.

It is certified that error appears in the above-identified patent and that said Letters Patent is hereby corrected as shown below:

59. An ink jet recording method for forming images by scanning a recording head and ejecting plural kinds of ink from the recording head onto a recording medium in accordance with record data, comprising the steps of:
    detecting coexistence of an image formed by a first ink an an image formed by a second ink in an area in the scanning direction of the recording head; and
    recording an image by scanning the recording head a number of times corresponding to the detection of the coexistence by said detecting step,
    wherein a number of times of scanning the recording head for recording an area where the coexistence is detected by said detecting step is greater than a number of times of scanning the recording head for recording an area where the coexistence is not detected by said detecting step.

60. An ink jet recording method according to claim 59, wherein the second ink has a different characteristic of permeation into the recording medium from that of the first ink.

61. An ink jet recording apparatus for forming images by scanning a recording head and ejecting plural kinds of ink from the recording head onto a recording medium in accordance with record data, said recording apparatus comprising:
    detecting means for detecting coexistence of an image formed by a first ink and an image formed by a second ink in an area in the scanning of the recording head; and
    recording control means for recording an image by scanning the recording head a number of times corresponding to the detection of the coexistence by said detecting means,
    wherein a number of times of scanning the recording head for recording an area where the coexistence is detected by said detecting means is greater than a number of times of scanning the recording head for recording an area where the coexistence is not detected by said detecting means.

62. An ink jet recording apparatus according to claim 61, wherein the second ink has a different characteristic of permeation into the recording medium from that of the first ink.

UNITED STATES PATENT AND TRADEMARK OFFICE
CERTIFICATE OF CORRECTION

PATENT NO. : 6,164,756
DATED : December 26, 2000
INVENTOR(S) : Kichiro Takahashi et al.

It is certified that error appears in the above-identified patent and that said Letters Patent is hereby corrected as shown below:

63. An ink jet recording method for forming images by scanning a recording head and ejecting plural kinds of ink from the recording head onto a recording medium in accordance with record data, comprising the steps of:
  detecting coexistence of an image formed by a first ink and an image formed by a second ink in an area; and
  recording an image by scanning the recording head a number of times corresponding to the detection of the coexistence by said detecting step,
  wherein a number of times of scanning the recording head for recording an area where the coexistence is detected by said detecting step is greater than a number of times of scanning the recording head for recording an area where the coexistence is not detected by said detecting step,
  wherein the second ink has a different characteristic of permeation into the recording medium from that of the first ink.

UNITED STATES PATENT AND TRADEMARK OFFICE
CERTIFICATE OF CORRECTION

PATENT NO. : 6,164,756
DATED : December 26, 2000
INVENTOR(S) : Kichiro Takahashi et al.

It is certified that error appears in the above-identified patent and that said Letters Patent is hereby corrected as shown below:

64. An ink jet recording apparatus for forming images by scanning a recording head and ejecting plural kinds of ink from the recording head onto a recording medium in accordance with record data, said recording apparatus comprising:
  detecting means for detecting coexistence of an image formed by a first ink and an image formed by a second ink in an area; and
  recording control means for recording an image by scanning the recording head a number of times corresponding to the detection of the coexistence by said detecting means,
  wherein a number of times of scanning the recording head for recording an area where the coexistence is detected by said detecting means is greater than a number of times of scanning the recording head for recording an area where the coexistence is not detected by said detecting means,
  wherein the second ink has a different characteristic of permeation into the recording medium from that of the first ink. --

Signed and Sealed this

Twenty-second Day of January, 2002

Attest:

Attesting Officer

JAMES E. ROGAN
Director of the United States Patent and Trademark Office